US007969618B2

(12) United States Patent
Suzuki et al.

(10) Patent No.: US 7,969,618 B2
(45) Date of Patent: Jun. 28, 2011

(54) IMAGE FORMING APPARATUS, IMAGE FORMING SYSTEM, COMPUTER READABLE RECORDING MEDIUM, AND IMAGE FORMING METHOD

(75) Inventors: Tadaomi Suzuki, Kanagawa (JP);
Shintaro Adachi, Kanagawa (JP);
Hiromi Kita, Kanagawa (JP); Tsutomu Kimura, Kanagawa (JP); Takeshi Furuyama, Kanagawa (JP); Kenji Yamada, Kanagawa (JP); Masakatsu Kanda, Kanagawa (JP); Hiroshi Hayashi, Kanagawa (JP); Shinji Hanaoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 739 days.

(21) Appl. No.: 11/959,544

(22) Filed: Dec. 19, 2007

(65) Prior Publication Data
US 2008/0158613 A1 Jul. 3, 2008

(30) Foreign Application Priority Data
Dec. 28, 2006 (JP) .................................. 2006-355608

(51) Int. Cl.
H04N 1/40 (2006.01)
(52) U.S. Cl. ........................................ 358/3.28; 358/468
(58) Field of Classification Search .................. 358/1.9, 358/2.1, 3.28, 500, 504, 400, 406, 468; 347/107
See application file for complete search history.

(56) References Cited

U.S. PATENT DOCUMENTS

| 4,450,453 | A | * | 5/1984 | Kitamura et al. | 347/225 |
| 4,782,367 | A | * | 11/1988 | Noguchi | 355/40 |
| 5,075,787 | A | * | 12/1991 | Shaughnessy et al. | 358/452 |
| 5,138,465 | A | * | 8/1992 | Ng et al. | 358/453 |
| 5,606,609 | A | * | 2/1997 | Houser et al. | 713/179 |
| 6,334,721 | B1 | | 1/2002 | Horigane | |
| 2005/0041263 | A1 | | 2/2005 | Ishikawa et al. | |
| 2005/0134896 | A1 | | 6/2005 | Koga | |
| 2005/0207228 | A1 | | 9/2005 | Yamashita et al. | |
| 2006/0274373 | A1 | | 12/2006 | Niitsuma | |

(Continued)

FOREIGN PATENT DOCUMENTS

JP   11184657 A   7/1999

(Continued)

OTHER PUBLICATIONS

Japanese Office Action corresponding to Japanese Patent Application No. 2006-355608 dated Jan. 25, 2011.

Primary Examiner — Thomas D Lee
Assistant Examiner — Stephen M Brinich
(74) Attorney, Agent, or Firm — Sughrue Mion, PLLC

(57) ABSTRACT

An image forming apparatus includes: a generating unit that generates a control image representing control information to be used for controlling an operation that is performed by the image forming apparatus; a superimposing unit that superimposes the control image generated by the generating unit on a print image; and an output unit that outputs a superimposed image generated by the superimposing unit performing the superimposition. The control information is to be used for performing a control operation so that a document formed with pages having the superimposed image printed thereon is collectively processed, with the superimposed image representing the control information. The control information contains the total number of pages of the document and the page number of the corresponding page having the superimposed image printed thereon.

12 Claims, 17 Drawing Sheets

U.S. PATENT DOCUMENTS

2007/0177762 A1    8/2007    Matsumoto

FOREIGN PATENT DOCUMENTS

| | | | |
|---|---|---|---|
| JP | 2000-165575 | A | 6/2000 |
| JP | 2001218037 | A | 8/2001 |
| JP | 2002223346 | A | 8/2002 |
| JP | 2002239751 | A | 8/2002 |
| JP | 3639763 | B2 | 1/2005 |
| JP | 2005151449 | A | 6/2005 |
| JP | 2005190426 | A | 7/2005 |
| JP | 2006121255 | A | 5/2006 |
| JP | 2006270432 | A | 10/2006 |
| JP | 2006319994 | A | 11/2006 |
| JP | 2006345043 | A | 12/2006 |
| JP | 2007081891 | A | 3/2007 |
| JP | 2007158947 | A | 6/2007 |

* cited by examiner

CD1~4 INFORMATION CODES
AC1~4 CODE AREAS
AS1~4 SYNCHRONOUS CODE AREAS
CP01, 02, 03, 11, 12 RESTRICTION CODES
IP8 LATENT IMAGE

US 7,969,618 B2

IMAGE FORMING APPARATUS, IMAGE FORMING SYSTEM, COMPUTER READABLE RECORDING MEDIUM, AND IMAGE FORMING METHOD

CROSS-REFERENCE TO RELATED APPLICATIONS

This application is based on and claims priority under 35 USC 119 from Japanese Patent Application No. 2006-355608 filed Dec. 28, 2006.

BACKGROUND

1. Technical Field

The present invention relates to an image forming apparatus, an image forming system, a computer readable recording medium, and an image forming method.

2. Related Art

As personal computers, printers, and copying machines have widely spread in recent years, duplicating a document has become easier.

SUMMARY

According to an aspect of the invention, there is provided an image forming apparatus that includes: a generating unit that generates a control image representing control information to be used for controlling an operation that is performed by the image forming apparatus; a superimposing unit that superimposes the control image generated by the generating unit on a print image; and an output unit that outputs a superimposed image generated by the superimposing unit performing the superimposition. In this image forming apparatus, the control information is to be used for performing a control operation so that a document formed with pages having the superimposed image printed thereon is collectively processed, with the superimposed image representing the control information. The control information contains the total number of pages of the document and the page number of the corresponding page having the superimposed image printed thereon.

BRIEF DESCRIPTION OF THE DRAWINGS

Exemplary embodiments of the present invention will be described in detail based on the following figures, wherein.

DETAILED DESCRIPTION

The following is a description of exemplary embodiments of the present invention, with reference to the accompanying drawings.

First Exemplary Embodiment

Figure 1:
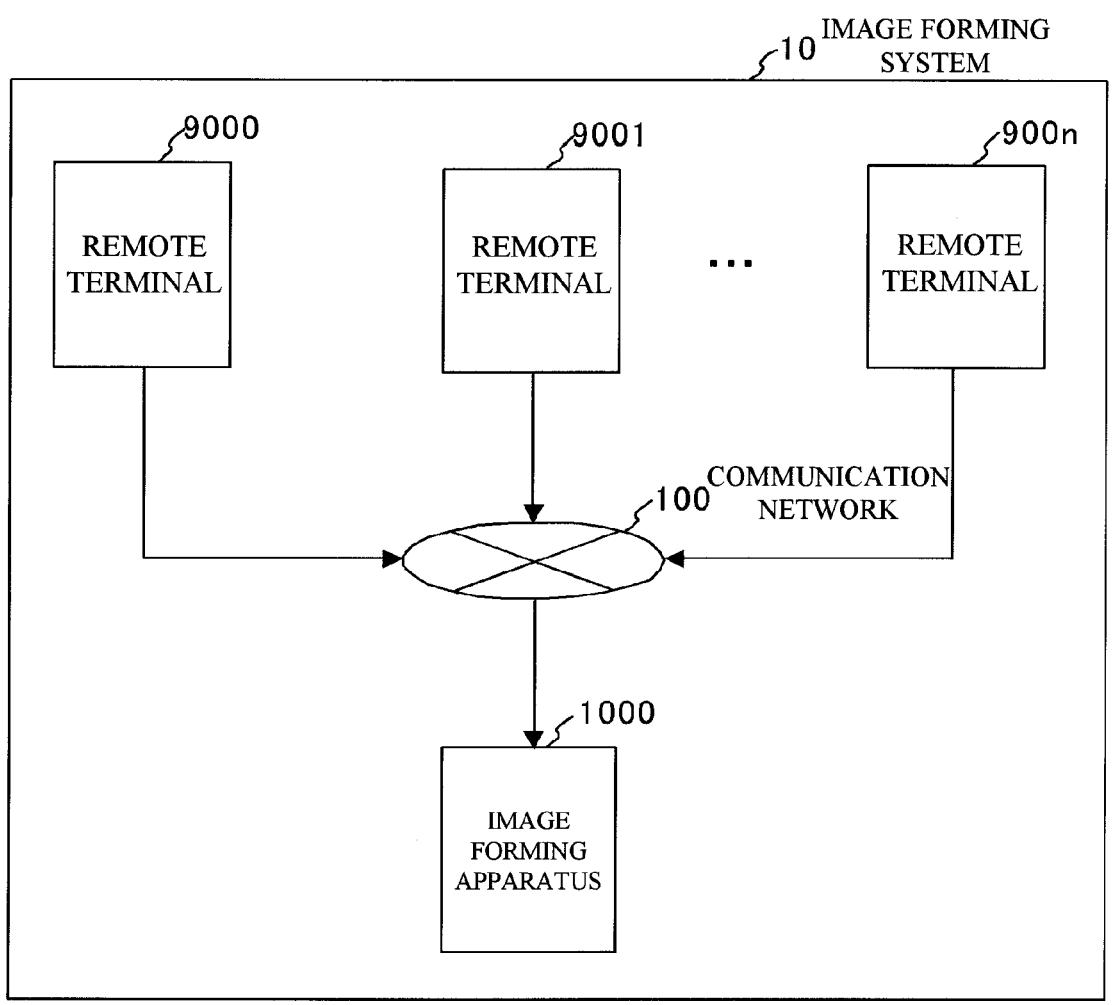
FIG. 1 is a functional block diagram showing an exemplary embodiment of an image forming system.

FIG. 1 shows the structure of an exemplary embodiment of an image forming system of the present invention.

The image forming system 10 in this exemplary embodiment includes a communication network 100, one or more remote terminals 9000 through 900$n$, and an image forming apparatus 1000.

The communication network 100 may be a LAN (Local Area Network), a WAN (Wide Area Network), a MAN (Metropolitan Area Network), or a public line network, for example. The communication network 100 connects the image forming apparatus 1000 to the remote terminals 9000 through 900$n$, so that the image forming apparatus 1000 can communication with the remote terminals 9000 through 900$n$.

Before explanation of the image forming apparatus 1000, the remote terminals 9000 through 900$n$ are described.

Since the remote terminals 9000 through 900$n$ have the same structures, connection, and functions as one another, only the remote terminal 9000 is described.

The remote terminal 9000 may be a personal computer or a PDA (Personal Digital Assistant), for example. The remote terminal 9000 is connected to the image forming apparatus 1000.

The remote terminal 9000 includes an input unit that may be formed with a keyboard, a pointing device, a touch panel, or buttons, for example, and a communication unit that may be formed with a network adaptor, for example, though not shown in the drawings.

The remote terminal 9000 receives control information and various instructions from the input unit, and transmits the control information and the various instructions to the image forming apparatus 1000 through the communication unit. The control information will be described later.

The image forming apparatus 1000 is connected to the remote terminals 9000 through 900$n$ via the communication network 100. The image forming apparatus 1000 obtains the various instructions and the control information from the remote terminals 9000 through 900$n$.

Figure 2:
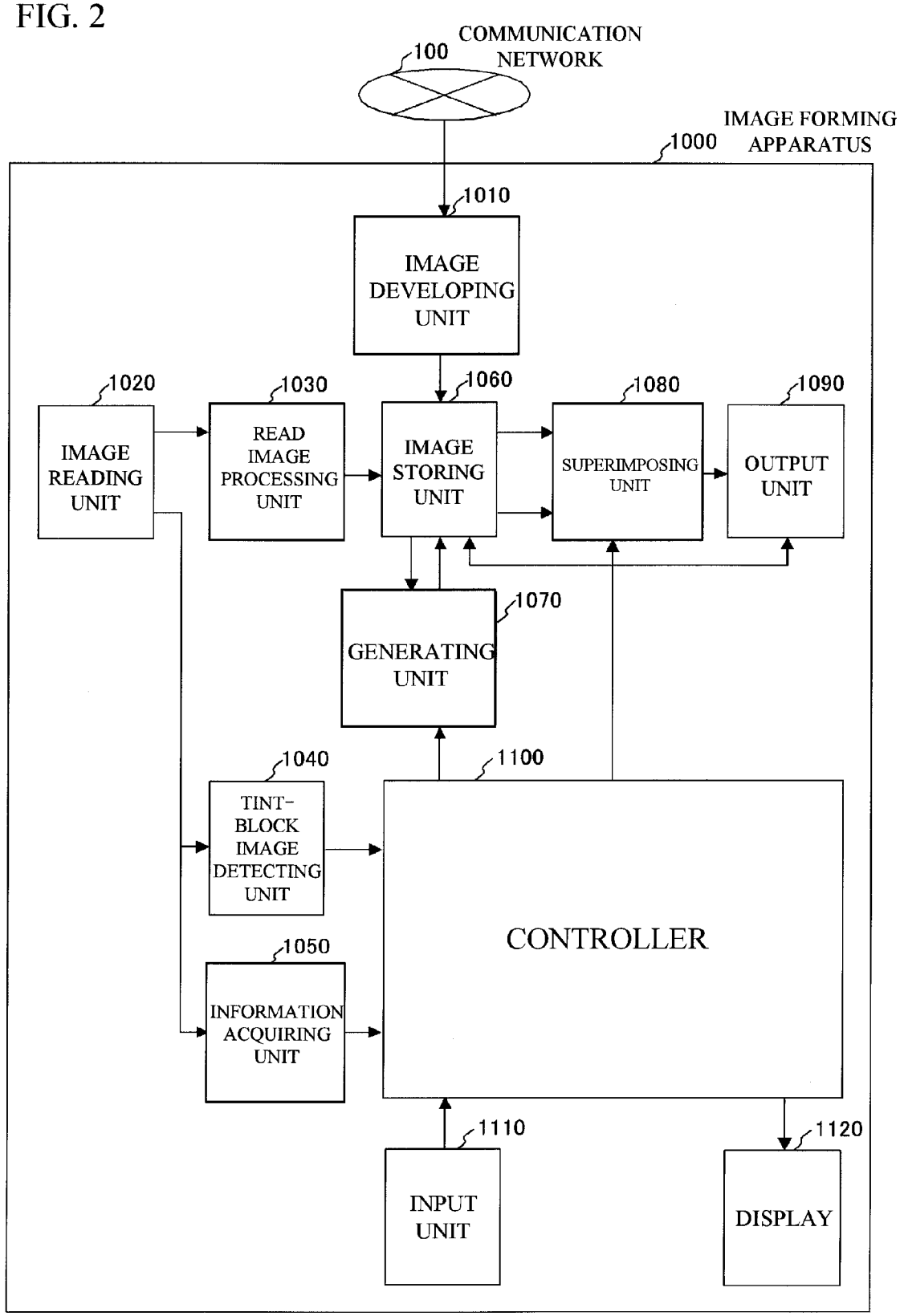
FIG. 2 is a functional block diagram showing an exemplary embodiment of an image forming apparatus.

Referring now to FIG. 2, the structure of the image forming apparatus 1000 in this exemplary embodiment is described.

FIG. 2 is a functional block diagram illustrating an example of the image forming apparatus 1000 of the first exemplary embodiment.

The image forming apparatus 1000 includes an image developing unit 1010, an image reading unit 1020, a read image processing unit 1030, a tint-block image detecting unit 1040, an information acquiring unit 1050, an image storing unit 1060, a generating unit 1070, a superimposing unit 1080, an output unit 1090, a controller 1100, an input unit 1110, and a display 1120.

The functions of the image developing unit 1010, the image reading unit 1020, the read image processing unit 1030, the tint-block image detecting unit 1040, the information acquiring unit 1050, the image storing unit 1060, the generating unit 1070, the superimposing unit 1080, the output unit 1090, the controller 1100, the input unit 1110, and the display 1120 are realized through software control performed by the image forming apparatus 1000.

Figure 3:
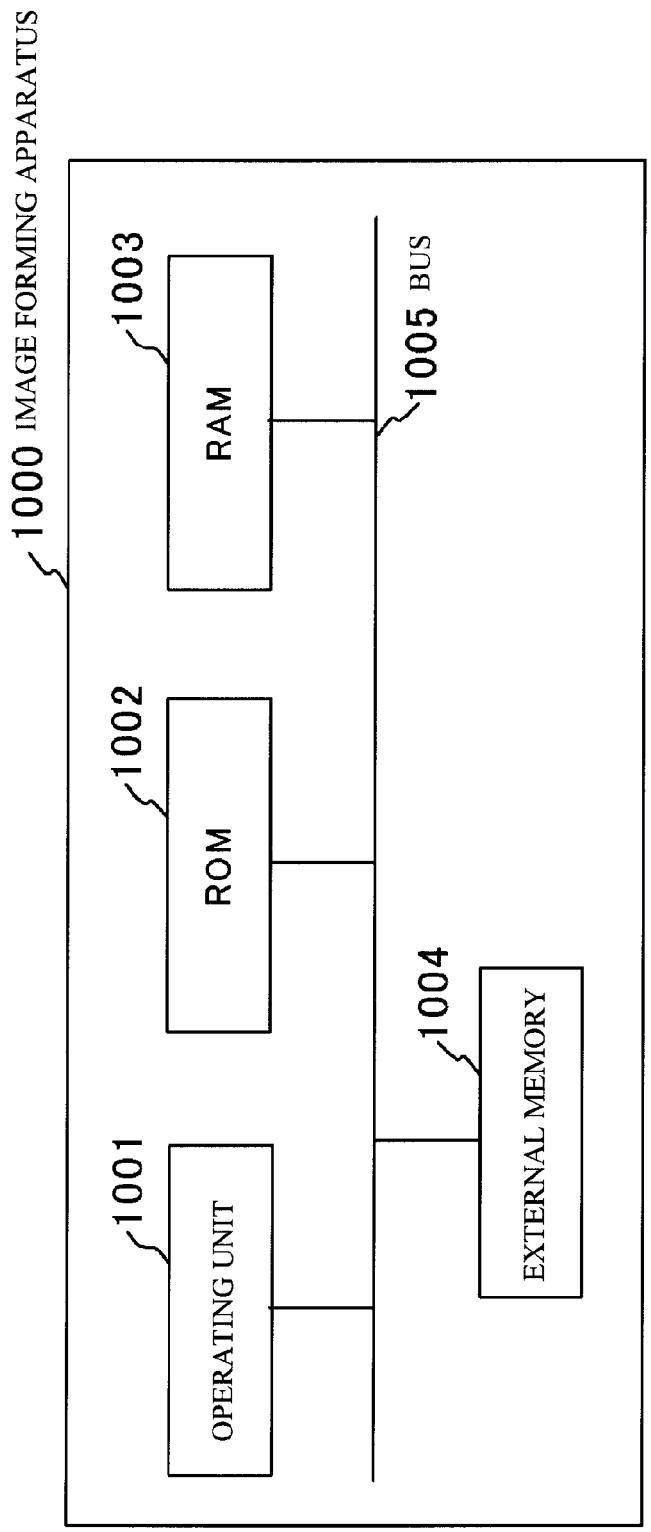
FIG. 3 shows an example hardware structure of the image forming apparatus.

Referring now to FIG. 3, the hardware structure of the image forming apparatus 1000 that performs the software control is described. FIG. 3 illustrates an example hardware structure of the image forming apparatus 1000 that performs the software control.

The image forming apparatus 1000 includes: an operating unit 1001 such as a CPU (Central Processing Unit); a ROM (Read-Only Memory) 1002 such as an EPROM (Erasable Programmable Read-Only Memory) or an EEPROM (Electrically Erasable Programmable Read-Only Memory); a RAM (Random Access Memory) 1003 that is a semiconductor memory device (a volatile memory) such as a DRAM (Dynamic RAM) or a SRAM (Static RAM) that loses the memory contents when the power is switched off, or a semiconductor memory device (a nonvolatile memory) such as a NVRAM (Nonvolatile RAM) that does not lose the memory contents even when the power is switched off; and an external memory 1004 such as a hard disk. The operating unit 1001, the ROM 1002, the RAM 1003, and the external memory 1004 are connected to one another with a bus 1005.

The software control is performed when the operating unit 1001 reads a program stored in at least one of the ROM 1002, the RAM 1003, and the external memory 1004, and performs an operation in accordance with the read program. In this manner, the functions of the above-described components are realized.

Referring back to FIG. 2, the structure of the image forming apparatus 1000 is further described.

The image developing unit 1010 is connected to the communication network 100 and the image storing unit 1060. The image developing unit 1010 receives information such as a page description language (PDL) for developing an image from the communication network 100. Based on the information, the image developing unit 1010 develops an image. The image developing unit 1010 then stores the developed image in the image storing unit 1060.

The image reading unit 1020 may be formed with a scanner, for example, and is connected to the read image processing unit 1030, the tint-block image detecting unit 1040, and the information acquiring unit 1050. The image reading unit 1020 reads an original document to be duplicated, and obtains an image. The image reading unit 1020 then outputs the obtained image to the read image processing unit 1030, the tint-block image detecting unit 1040, and the information acquiring unit 1050.

Alternatively, the image reading unit 1020 may be formed with a USB (Universal Serial Bus) card, for example. This image reading unit 1020 obtains an image by reading an electronic image file in a format such as JPEG (Joint Photographic Experts Group), BMP (Bit MaP), GIF (Graphic Interchange Format), or a TIFF (Tagged Image File Format) that is stored in an external memory device such as a flash memory connected to the image reading unit 1020. The image reading unit 1020 may obtain an image by reading an electronic file in a format such as PDF (Portable Document Format).

Alternatively, the image reading unit 1020 may be formed with a network card, for example. This image reading unit 1020 is connected to the communication network 100, and is designed to obtain an image by reading an electronic image file from the remote terminal 9000 via the communication network 100 or to obtain an image by reading an electronic file.

The image reading unit 1020 may also be connected to the communication network 100, and be designed to obtain an image by receiving image information transferred from the remote terminal 9000 via the communication network 100 that is a public line network in accordance with the G3 or G4 standards that are the FAX information transfer standards.

The read image processing unit 1030 is connected to the image reading unit 1020 and the image storing unit 1060. The read image processing unit 1030 obtains an image from the image reading unit 1020, and performs an image processing operation such as an image correction, a color conversion, or an enlarging or reducing operation. The read image processing unit 1030 outputs the processed image to the image storing unit 1060.

The tint-block image detecting unit 1040 is connected to the image reading unit 1020 and the controller 1100. The tint-block image detecting unit 1040 obtains the image read by the image reading unit 1020.

The tint-block image detecting unit 1040 then detects a control image representing the control information from the obtained image. In this exemplary embodiment, a background tint-block image is used as the control image.

The tint-block image detecting unit 1040 then outputs a result of a determination made on whether the obtained image contains a background tint-block image, to the controller 1100.

Figure 4:
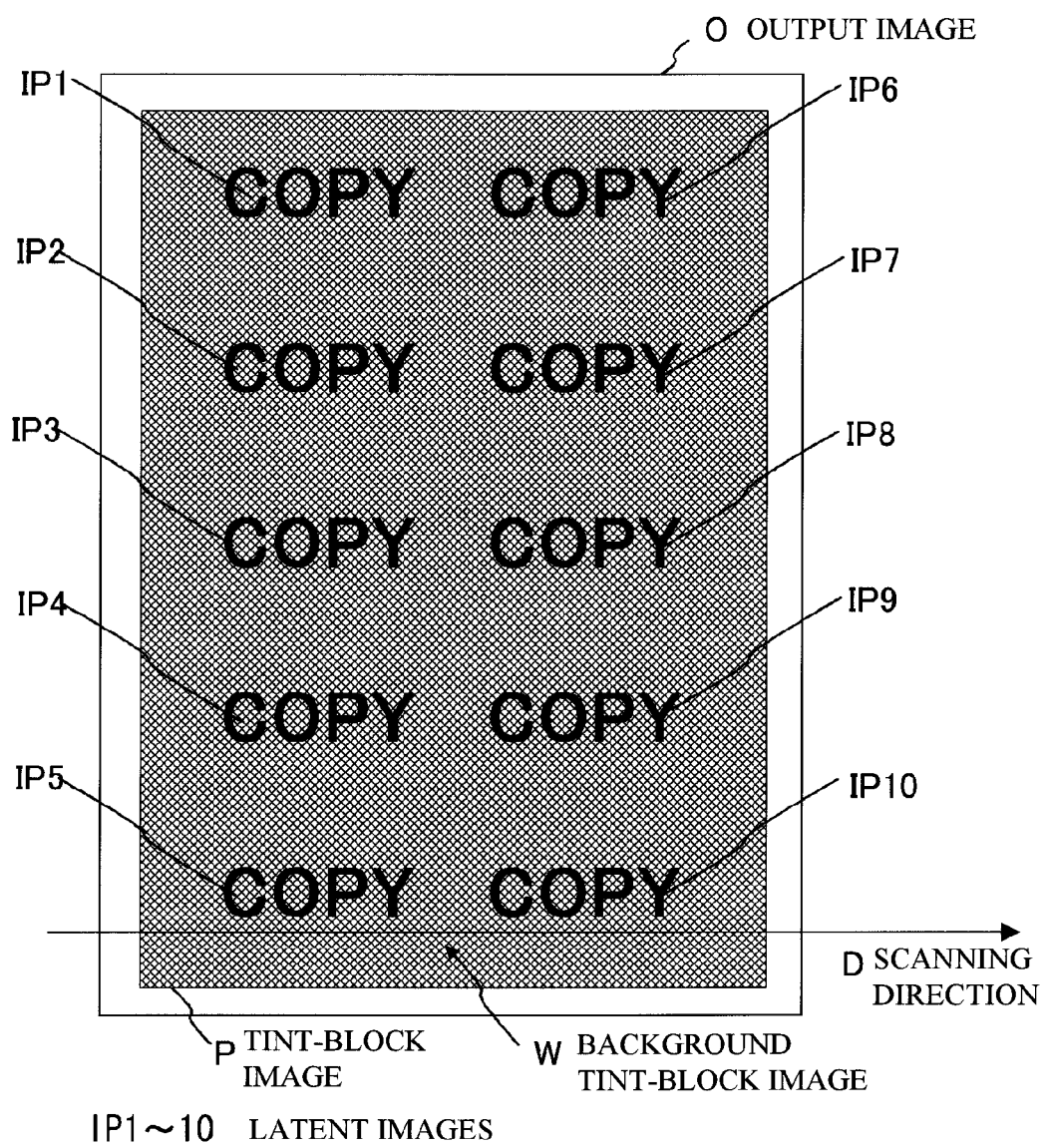
FIG. 4 illustrates an image of a background tint-block image.

Referring now to FIG. 4, a background tint-block image to be detected by the tint-block image detecting unit 1040 is described. FIG. 4 shows an example of a background tint-block image.

Here, a background tint-block image is formed with latent image portions and background portions. The background portions include a tint-block image PB formed with predetermined repetitive diagonal lines (hereinafter referred to simply as the designated images). The latent image portions include images formed with predetermined repetitive dots that cannot be reproduced as a result of a copying operation. A background tint-block image W is to be combined with the background of an output image O to be printed out.

More specifically, the background tint-block image W is formed with latent images IP that are the latent image portions, and the tint-block image PB covering the entire area or at least a part of the area of the output image O, as shown in the output image O in FIG. 4.

The tint-block image PB and each of the latent images IP have different repetitive images from each other. However, the output image O is formed so that the pixel areas and the pixel colors of the respective unit areas are the same. With this arrangement, the background looks gray to the human eye.

Each of the latent images IP is formed with smaller dots than the other latent images in the duplicated document, so that the latent images IP appear to pop up and can be recognized by the human eye.

Figure 5:
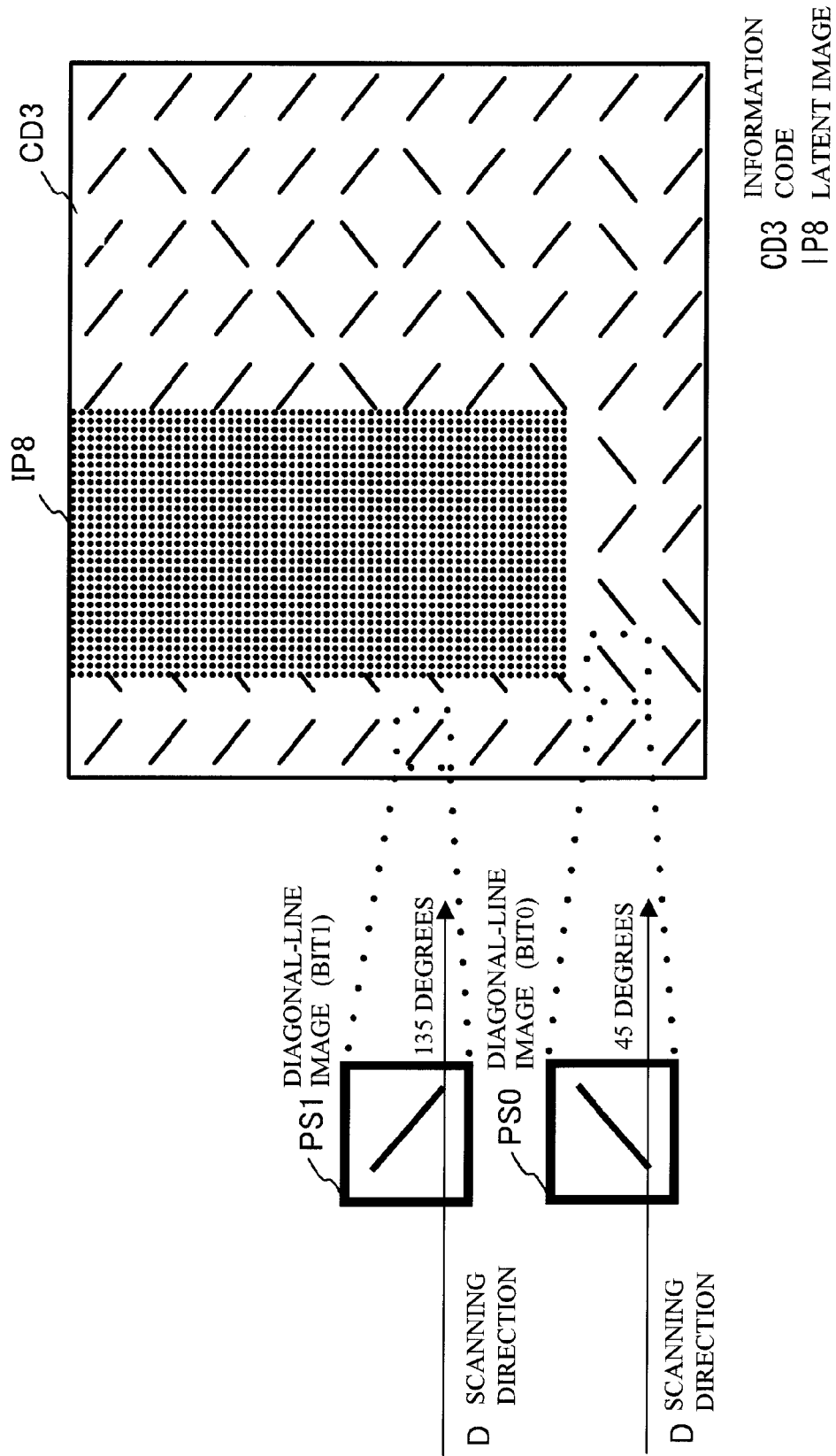
FIG. 5 illustrates an example of codes.

The tint-block image PB is formed with codes, and the codes are formed with predetermined repetitive images. Referring now to FIG. 5, the codes that form the tint-block image PB are described. FIG. 5 shows an example of the designated images that form the codes.

FIG. 5 is a partially enlarged view of the background tint-block image W shown in FIG. 4. The codes that form the background tint-block image W are formed with designated images PS that are diagonal lines. The diagonal-line images PS include lines tilted 45 degrees counterclockwise with respect to the scanning direction D, and lines tilted 135 degrees counterclockwise with respect to the scanning direction D. Each of the lines tilted 45 degrees represents "bit 0" as an information code CD, and each of the lines tilted 135 degrees represents "bit 1" as an information code CD.

Figure 6:
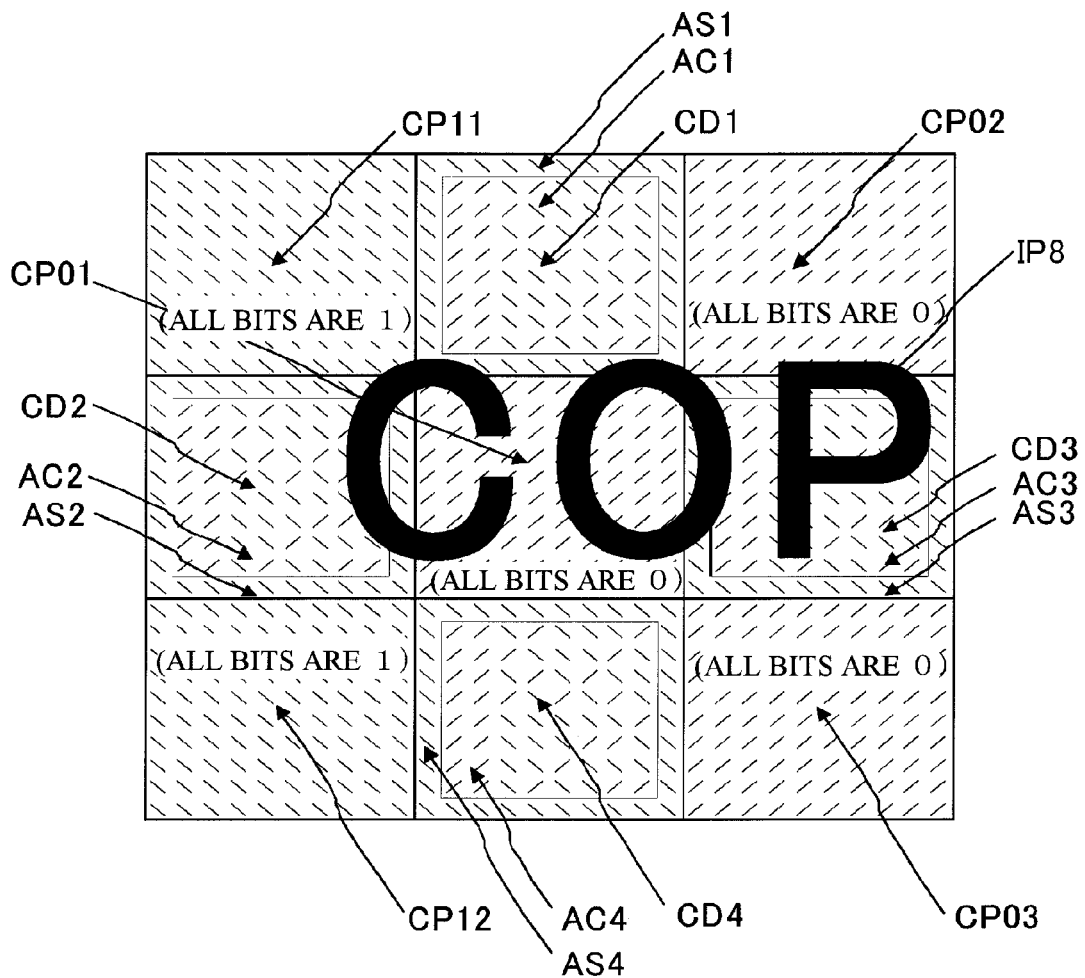
FIG. 6 illustrates an example of prohibiting codes.

The codes are also formed with information codes CD representing the information including the control information for controlling operations to be performed by the image forming apparatus (hereinafter referred to simply as the code information), and restriction codes CP each indicating a need to perform an operation in accordance with the information codes CD. Referring now to FIG. 6, the restriction codes CP are described. FIG. 6 shows an example of the restriction codes CP.

The restriction codes CP include restriction codes CP in which all the diagonal-line images PS represent "bit 0", and restriction codes CP in which all the diagonal-line images PS represent "bit 1". As will be described in later exemplary embodiments, a check is made to determine whether an image read into the image forming apparatus contains the background tint-block image W, based on whether a predetermined number or more of restriction codes CP of the two kinds have been detected.

Each of the information codes CD is formed with a synchronous code area AS and a code area AC. The synchronous code area AS is the rectangular outer peripheral region of a predetermined size that surrounds the code area AC. All the diagonal-line images PS in the rectangular outer peripheral region are diagonal-line images PS1 each representing "bit 1". The code area AC represents the code information including the control information through a combination of diagonal-line images PS0 each representing "bit 0" and the diagonal-line images (designated images) PS1 each representing "bit 1".

Figure 7:
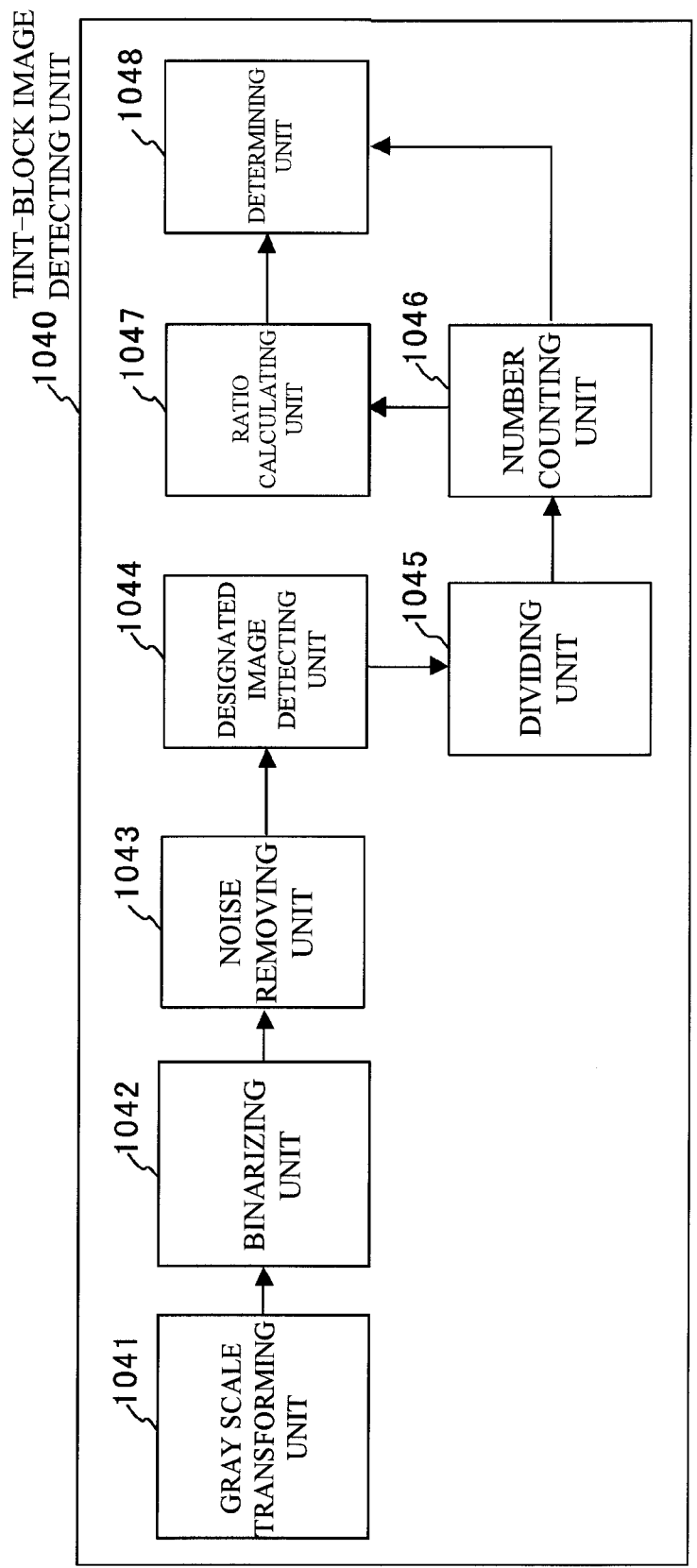
FIG. 7 is a functional block diagram showing an exemplary embodiment of the tint-block image detecting unit.

Referring now to FIG. 7, the structure of the tint-block image detecting unit 1040 is described. FIG. 7 is a functional block diagram of the tint-block image detecting unit of this exemplary embodiment.

The tint-block image detecting unit 1040 includes a gray scale transforming unit 1041, a binarizing unit 1042, a noise removing unit 1043, a designated image detecting unit 1044, a dividing unit 1045, a number counting unit 1046, a ratio calculating unit 1047, and a determining unit 1048.

Although not shown in the drawing, the gray scale transforming unit 1041 is connected to the image reading unit 1020 and the binarizing unit 1042. The gray scale transforming unit 1041 obtains a read image from the image reading unit 1020. The gray scale transforming unit 1041 then performs a gray scale transformation on the obtained image. The gray scale transforming unit 1041 then outputs the gray scale image to the binarizing unit 1042.

The binarizing unit 1042 is connected to the gray scale transforming unit 1041 and the noise removing unit 1043. The binarizing unit 1042 obtains the gray scale image from the gray scale transforming unit 1041. The binarizing unit 1042 then performs a binarizing operation so that each of the pixels of the gray scale image is represented by the two values of 0 and 1, which represent black and white, respectively. The binarizing unit 1042 then outputs the binarized image to the noise removing unit 1043.

The noise removing unit 1043 is connected to the binarizing unit 1042 and the designated image detecting unit 1044. The noise removing unit 1043 obtains the binarized image information from the binarizing unit 1042. The noise removing unit 1043 then performs a noise removing operation.

More specifically, the noise removing unit 1043 detects a block of pixels formed by combined black pixels. If the size of the pixel block (the number of combined pixels) is within a predetermined range, the noise removing unit 1043 replaces each of the pixels forming the pixel block with a white pixel.

The predetermined range is set so that the designated images PS that are diagonal-line images, the independent designated dots that are the other designated images, and the characters and figures in the document, are not erased. Lastly, the noise removing unit 1043 outputs the image information subjected to the noise removal to the designated image detecting unit 1044.

The designated image detecting unit 1044 is connected to the noise removing unit 1043 and the dividing unit 1045. The designated image detecting unit 1044 obtains the image information subjected to the noise removal from the noise removing unit 1043. The designated image detecting unit 1044 then detects the designated images (diagonal-line images) PS.

More specifically, the designated image detecting unit 1044 detects the image information corresponding to the diagonal-line images PS, based on the information containing the image information. If the information corresponding to the designated image (diagonal-line image) PS0 representing "bit 0" is detected, the designated image detecting unit 1044 outputs a pixel value "0". If the information corresponding to the designated image (diagonal-line image) PS1 representing "bit 1" is detected, the designated image detecting unit 1044 outputs a pixel value "1". If no designated images (diagonal-line images) PS are detected, the designated image detecting unit 1044 outputs a pixel value "3". Lastly, the designated image detecting unit 1044 outputs the image information indicating the detection result with respect to each pixel to the dividing unit 1045.

The dividing unit 1045 is connected to the designated image detecting unit 1044 and the number counting unit 1046. The dividing unit 1045 obtains the image information obtained as a result of an operation of detecting the designated images (diagonal-line images) PS from the designated image detecting unit 1044.

The dividing unit 1045 then divides the obtained image information into rectangular areas of a predetermined size. Here, the predetermined size of each of the rectangular areas is smaller than a half the size of the area of the restriction codes CP and the information codes CD, and at least one of the rectangular areas is contained in the area of the restriction codes CP and the information codes CD. Lastly, the dividing unit 1045 outputs the divided image information to the number counting unit 1046.

The number counting unit 1046 is connected to the dividing unit 1045, the ratio calculating unit 1047, and the determining unit 1048. The number counting unit 1046 obtains the divided image information from the dividing unit 1045. The number counting unit 1046 then counts the number of pixels with the pixel value "0" and the number of pixels with the pixel value "1" in each rectangular area. The number counting unit 1046 then outputs the count results to the ratio calculating unit 1047. The number counting unit 1046 also outputs the total numbers of pixels with the pixel value "0" and pixels with the pixel value "1" to the determining unit 1048.

The ratio calculating unit 1047 is connected to the number counting unit 1046 and the determining unit 1048. The ratio calculating unit 1047 obtains the number of pixels with the pixel value "0" and the number of pixels with the pixel value "1" from the number counting unit 1046. The ratio calculating unit 1047 then calculates the proportion of the pixels with the pixel value "0", and outputs the result to the determining unit 1048.

The determining unit 1048 is connected to the number counting unit 1046, the ratio calculating unit 1047, and the controller 1100. The determining unit 1048 obtains the total numbers of pixels with the pixel value "0" and pixels with the pixel value "1" from the number counting unit 1046. The determining unit 1048 also obtains the proportion of the pixels with the pixel value "0" from the ratio calculating unit 1047. Based on the obtained information, the determining unit 1048 performs a determining operation.

To explain the determining operation, the characteristics to be utilized in the determining operation are described. If the inside of a rectangular area being processed is located inside the restriction code CP1 in which all the bits represent "1", the diagonal-line images corresponding to a predetermined number or more of bits "1" in the rectangular area are detected, but few diagonal-line images corresponding to bits "0" are detected. Accordingly, the proportion of the diagonal-line images corresponding to bits "0" is very small and is almost 0.0.

If the rectangular area being processed contains at least a part of an information code, the diagonal-line images PS0 corresponding to bits "0" and the diagonal-lines PS1 corresponding to bits "1" are detected from the inside of the rectangular area. Accordingly, the proportion of the diagonal-line images PS0 corresponding to bits "0" is smaller than 1.0 and is larger than 0.0, falling in the range of 0.1 to 0.9.

If the input image information represents an image having the information codes CD buried therein, the restriction codes CP0 in which all the bits in the rectangular areas represent "0", and the restriction codes CP1 in which all the bits in the rectangular areas represent "1" are buried in the image.

The following determining operation utilizing the above characteristics is performed.

If the total number of pixels with the pixel value "0" is larger than a first threshold value, and the proportion of the pixels with the pixel value "0" is larger than a second threshold value, the determining unit 1048 determines that the subject rectangular area is a restriction code in which all the bits represent "0" (hereinafter referred to simply as a "restriction code 0").

If the total number of pixels with the pixel value "1" is larger than the first threshold value, and "1—the proportion of the pixels with the pixel value "0" " is larger than the second threshold value, the determining unit 1048 determines that the subject rectangular area is a restriction code in which all the bits represent "1" (hereinafter referred to simply as a "restriction code 1").

In any other cases than the above two cases, the determining unit 1048 determines that the subject rectangular area is not a restriction code CP.

Based on the size of each rectangular area and the size of each designated image, the first threshold value is set to have a buffer value added to the logical number of designated images that should be contained in each rectangular area.

The determining unit 1048 calculates the number of rectangular areas determined to be restriction codes 0, and the number of rectangular areas determined to be restriction codes 1, independently of each other. If the number of rectangular areas determined to be restriction codes 0 is equal to or larger than a threshold value "3", and the number of rectangular areas determined to be restriction codes 1 is equal to or larger than the threshold value "3", the determining unit 1048 determines that the subject image contains the tint-block image PB having the restriction codes, and outputs the determination result to the controller 1100.

Referring back to FIG. 2, the explanation of the structure of the image forming apparatus 1000 is continued.

The information acquiring unit 1050 is connected to the image reading unit 1020 and the controller 1100. The information acquiring unit 1050 obtains the image read by the image reading unit 1020.

The information acquiring unit 1050 then obtains the code information from the code areas AC forming the background tint-block image W contained in the obtained image. The information acquiring unit 1050 decodes the obtained code information. The information acquiring unit 1050 then outputs the decoded code information to the controller 1100.

Figure 8:
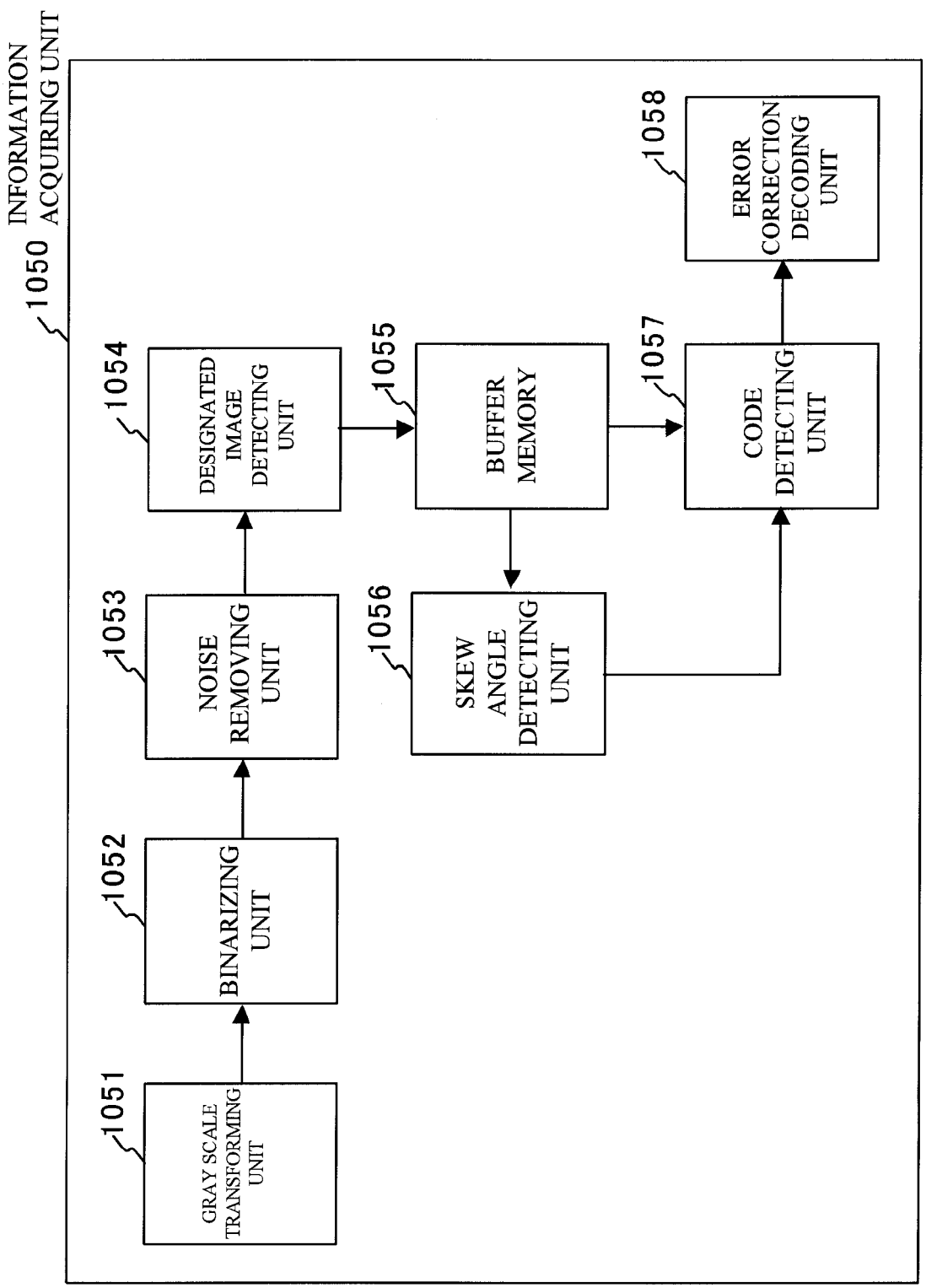
FIG. 8 is a functional block diagram showing an exemplary embodiment of the image acquiring unit.

Referring now to FIG. 8, the structure of the information acquiring unit 1050 is described. FIG. 8 illustrates an example structure of the information acquiring unit.

The information acquiring unit 1050 includes a gray scale transforming unit 1051, a binarizing unit 1052, a noise removing unit 1053, a designated image detecting unit 1054, a buffer memory 1055, a skew angle detecting unit 1056, a code detecting unit 1057, and an error correction decoding unit 1058.

Since the gray scale transforming unit 1051, the binarizing unit 1052, the noise removing unit 1053, and the designated image detecting unit 1054 of the information acquiring unit 1050 are the same as the gray scale transforming unit 1041, the binarizing unit 1042, the noise removing unit 1043, and the designated image detecting unit 1044 of the tint-block image detecting unit 1040, explanation of them is omitted here.

The buffer memory 1055 may be an external memory device such as a SDRAM (Synchronous Dynamic Random Access Memory) or a hard disk, for example. The buffer memory 1055 is connected to the designated image detecting unit 1054, the skew angle detecting unit 1056, and the code detecting unit 1057.

The image information from which designated images have been detected by the designated image detecting unit 1054 is stored in the buffer memory 1055. The skew angle detecting unit 1056 and the code detecting unit 1057 refer to the image information stored in the buffer memory 1055.

The skew angle detecting unit 1056 is connected to the buffer memory 1055 and the code detecting unit 1057. The skew angle detecting unit 1056 refers to the image information stored in the buffer memory 1055. The skew angle detecting unit 1056 then detects a skew angle from the image information, to determine the skew angle of the referred image information. Lastly, the skew angle detecting unit 1056 outputs the skew angle to the code detecting unit 1057.

The code detecting unit 1057 is connected to the buffer memory 1055, the skew angle detecting unit 1056, and the error correction decoding unit 1058. The code detecting unit 1057 refers to the image information stored in the buffer memory 1055. The code detecting unit 1057 then receives the skew angle from the skew angle detecting unit 1056. Based on the skew angle and the image information, the code detecting unit 1057 performs a code information detecting operation.

More specifically, based on the skew angle, the code detecting unit 1057 extracts pixels with the pixel value "0" or "1" (pixels corresponding to "bits 0" or "bits 1"). The code detecting unit 1057 then detects synchronization codes from the extracted bit string. Synchronization codes are defined as codes formed with the bits "1" that constitute the external periphery of a rectangular area having a predetermined length and width. The bit string surrounded by the synchronization codes is equivalent to the code information. The code detecting unit 1057 rearranges the bit string into a one-dimensional bit string, and outputs the rearranged bit string to the error correction decoding unit 1058.

The error correction decoding unit 1058 is connected to the code detecting unit 1057 and the controller 1100. The error correction decoding unit 1058 performs an error correction decoding operation on the code information obtained from the code detecting unit 1057. The error correction decoding unit 1058 then outputs the code information subjected to the error correction decoding to the controller 1100.

Referring back to FIG. 2, the explanation of the image forming apparatus 1000 is continued.

The image storing unit 1060 has a memory that is an external memory device such as a hard disk or a flash memory. The image storing unit 1060 is connected to the image developing unit 1010, the read image processing unit 1030, the generating unit 1070, the superimposing unit 1080, and the controller 1100.

The image storing unit 1060 obtains original images from the image developing unit 1010 and the read image processing unit 1030, and then stores the obtained original images into the memory of the image storing unit 1060. The image storing unit 1060 also stores the background tint-block image W generated by the generating unit 1070. The background tint-block image W and the image information stored in the image storing unit 1060 are read by the superimposing unit 1080.

The generating unit 1070 is connected to the image storing unit 1060 and the controller 1100. From the controller 1100, the generating unit 1070 obtains the concentration of the designated images PS forming the background tint-block image W, the code information represented by the designated images PS in the code region AC forming the background tint-block image W, the character string shown as the latent images IP forming the background tint-block image W, and the position at which the background tint-block image W is superimposed on the print image.

Figure 9:
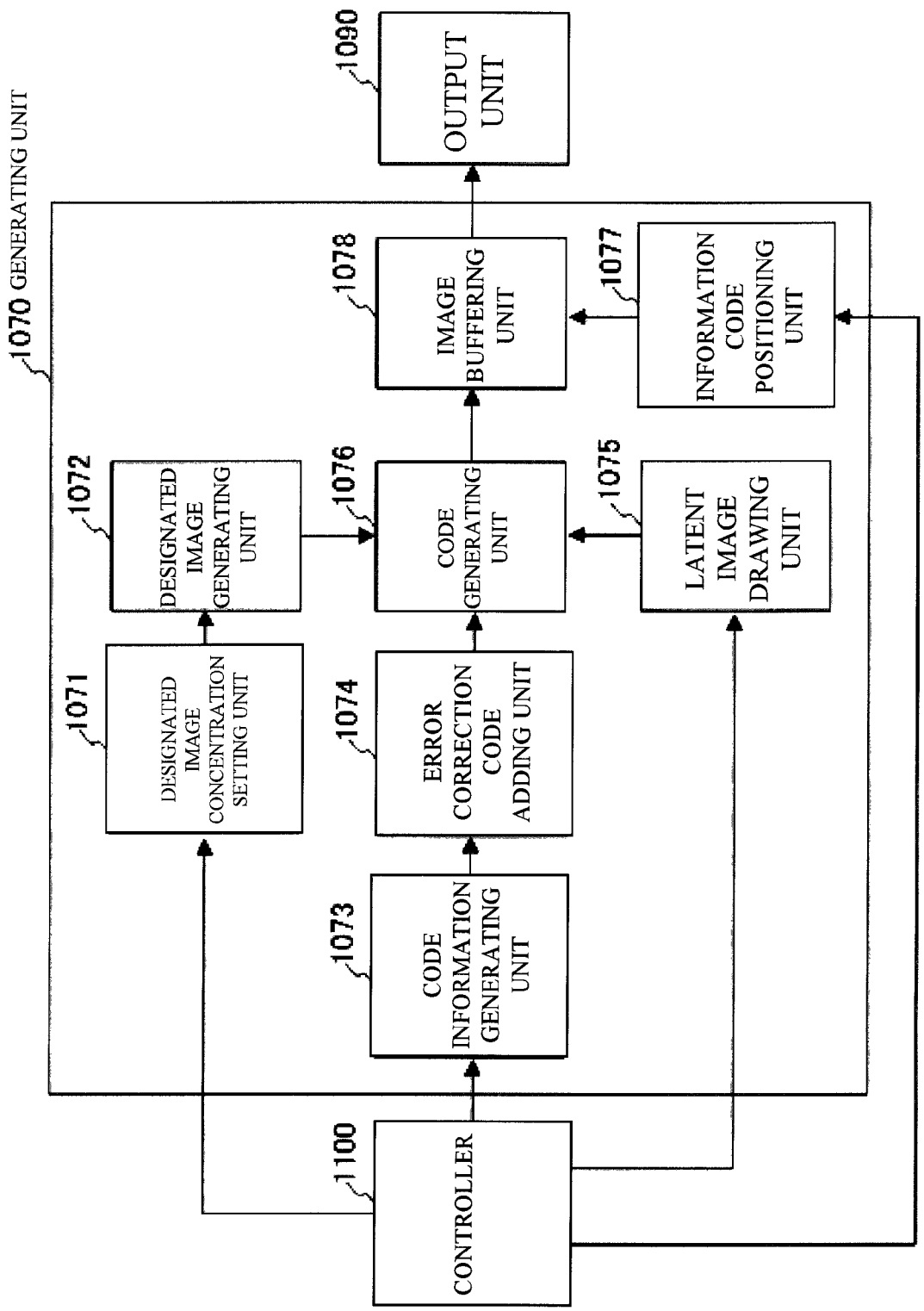
FIG. 9 is a functional block diagram showing an exemplary embodiment of the generating unit.

Referring now to FIG. 9, the generating unit 1070 is described. FIG. 9 shows an example structure of the generating unit 1070.

The generating unit 1070 includes a designated image concentration setting unit 1071, a designated image generating unit 1072, a code information generating unit 1073, an error correction code adding unit 1074, a latent image drawing unit 1075, a code generating unit 1076, an information code positioning unit 1077, and an image buffering unit 1078.

The designated image concentration setting unit 1071 has a memory formed with a DRAM (Dynamic RAM) or a SRAM (Static RAM), for example. The designated image concentration setting unit 1071 is connected to the designated image generating unit 1072 and the controller 1100. The designated image concentration setting unit 1071 has the diagonal-line image concentration designated by the controller 1100, and stores the designated concentration in the memory. Later, the designated image generating unit 1072 refers to the stored concentration.

The designated image generating unit 1072 is connected to the designate image concentration setting unit 1071 and the code generating unit 1076. The designated image generating unit 1072 has a memory formed with an external memory device such as a hard disk or a flash memory. In the memory, a matrix that is to be used for generating the designated images and has pixel values added to matrix elements (a dither matrix, for example) is stored.

In this exemplary embodiment, the memory in the designated image generating unit 1072 holds two kinds of matrixes: a matrix for generating the diagonal-line images (designated images) PS0 corresponding to "bits 0" of the information codes CD, and a matrix for generating the diagonal-line images (designated images) PS1 corresponding to "bits 1" of the information codes CD.

Figure 10:
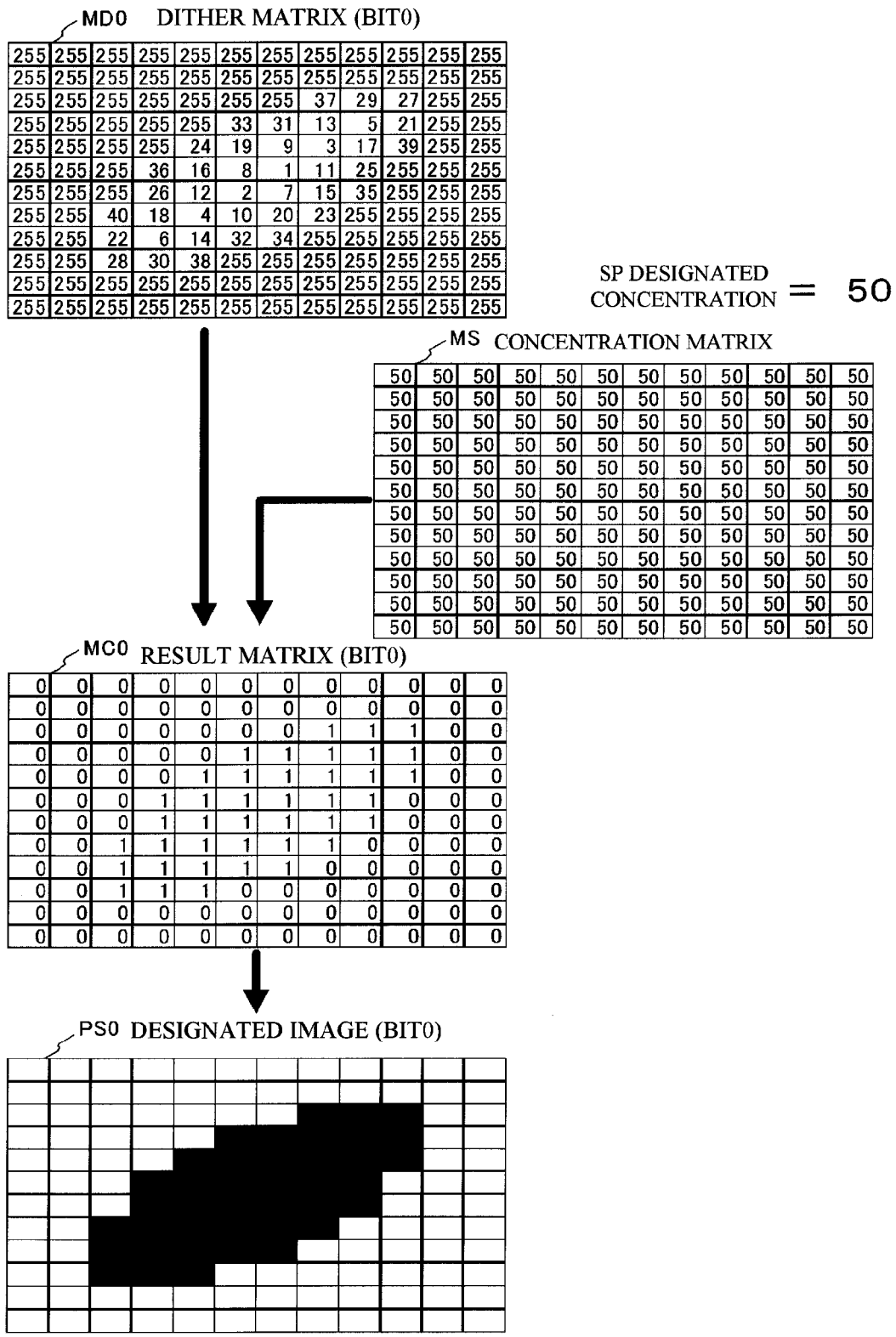
FIG. 10 shows the relationship between the designated concentration and the designated images.

Referring now to FIG. 10, the method to be utilized by the designated image generating unit 1072 to generate the designated images PS is described. FIG. 10 shows the relationship between the designated concentration and the designated images. Although only bits 0 are shown in FIG. 10, the same method is utilized for bits 1, and therefore, explanation of the case of bits 1 is omitted here.

First, the designated image generating unit 1072 generates a concentration matrix MS that has the same number of rows and columns as a dither matrix MD0, and has a designated concentration SP as an element. The designated image generating unit 1072 then compares the dither matrix MD0 with the concentration matrix MS.

The designated image generating unit 1072 then generates a result matrix MC that has "1" as a matrix element where the value of an element of the dither matrix MD is equal to or smaller than the value of the corresponding element of the concentration matrix MS, and has "0" as a matrix element where the value of an element of the dither matrix MD is larger than the value of the corresponding element of the concentration matrix MS. After that, the designated image generating unit 1072 generates a designated image PS, with the elements of the result matrix MC being associated with the dots constituting the designated image PS. More specifically, the dots associated with the elements having the value "1" are used as the dots constituting the designated image PS.

Referring back to FIG. 9, explanation of the generating unit 1070 is continued.

The designated image generating unit 1072 refers to the concentration stored in the designated image concentration setting unit 1071. After that, the designated image generating unit 1072 obtains both the matrix representing the "bits 0" and the matrix representing the "bits 1" stored in the memory of the designated image generating unit 1072.

Based on the obtained matrixes, the designated image generating unit 1072 generates a diagonal-line image (designated image) PS having the obtained concentration. More specifically, the designated image generating unit 1072 generates the diagonal-line image (designated image) PS0 representing the bits 0 of the code information, based on the matrix representing the bits 0 of the code information. The designated image generating unit 1072 generates the diagonal-line image (designated image) PS1 representing the bits 1 of the code information, based on the matrix representing the bits 1 of the code information. The designated image generating unit 1072 then outputs the generated designated images to the code generating unit 1076.

The code information generating unit 1073 is connected to the controller 1100 and the error correction code adding unit 1074. The code information generating unit 1073 obtains the control information as a one-dimensional bit string from the controller 1100, and converts the control information into two-dimensional information represented by a two-dimensional bit matrix. The code information generating unit 1073 then outputs the converted two-dimensional information to the error correction code adding unit 1074.

The error correction code adding unit 1074 is connected to the code information generating unit 1073 and the code generating unit 1076. The error correction code adding unit 1074 obtains the two-dimensional information from the code information generating unit 1073. After that, the error correction code adding unit 1074 generates two-dimensional code information containing error correction codes from the obtained matrix information. The error correction code adding unit 1074 then outputs the generated code information to the code generating unit 1076.

Figure 11:
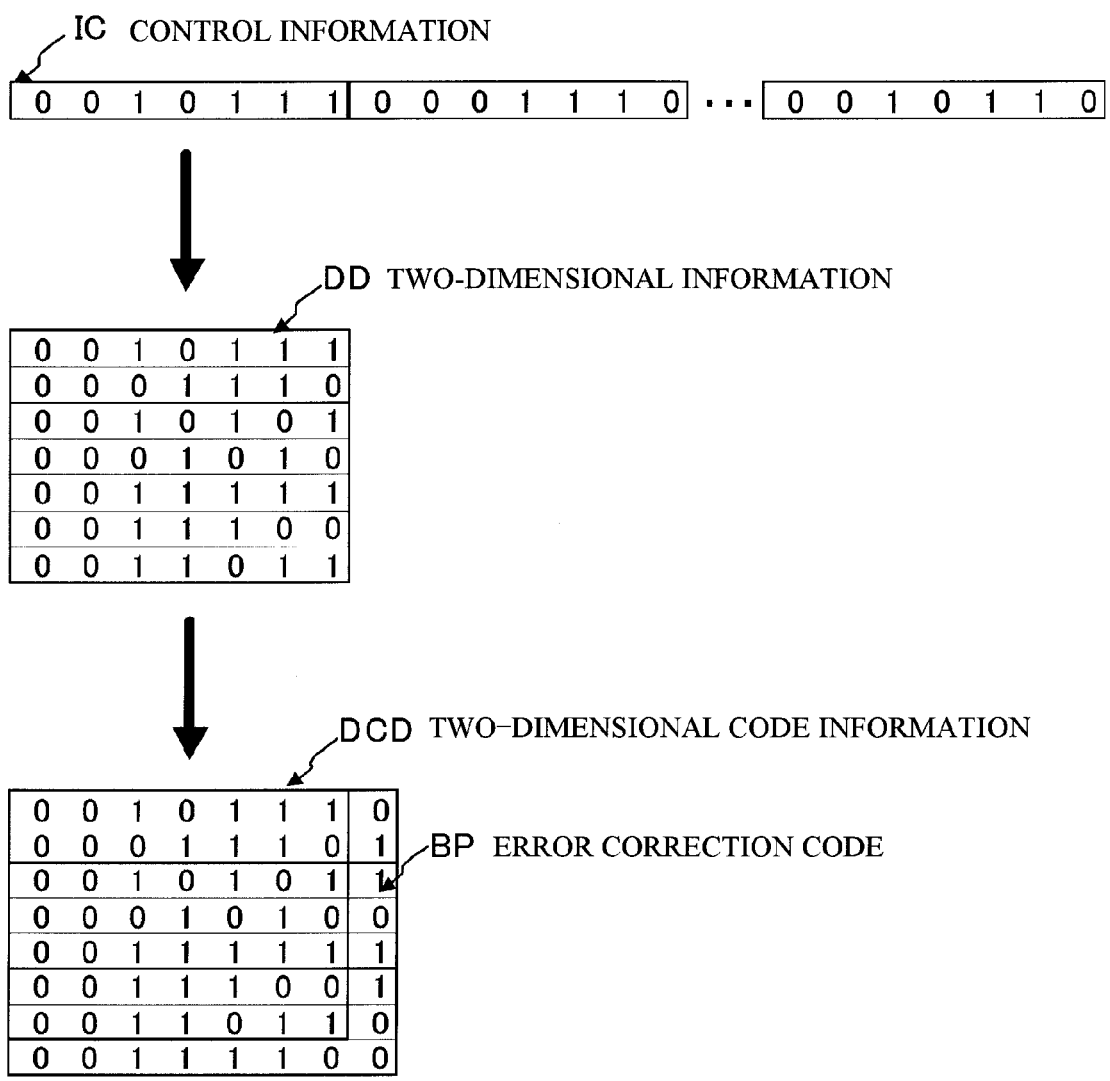
FIG. 11 illustrates an example of two-dimensional code information.

Referring now to FIG. 11, the two-dimensional code information is described. FIG. 11 shows an example of the two-dimensional code information.

The code information generating unit 1073 divides the control information IC of the one-dimensional bit string shown in FIG. 11 by a predetermined bet length. Based on the divided information, the code information generating unit 1073 generates the two-dimensional information DD in the form of the two-dimensional bit matrix shown in FIG. 11, the row of the two-dimensional bit matrix being formed in the dividing order.

The error correction code adding unit 1074 adds error correction codes BP to the two-dimensional bit matrix DD. The error correction codes BP are to be used for vertical parity checks utilizing the even parity checking method, horizontal parity checks, and the likes.

In the above-described example, the error correction codes to be used for vertical parity checks and horizontal parity checks. However, the present invention is not limited to that. For example, it is possible to use hamming codes, Read-Solomon codes, or cross-interleave Read-Solomon codes, for example.

Referring back to FIG. 9, explanation of the generating unit 1070 is continued.

The latent image drawing unit 1075 is connected to the code generating unit 1076 and the controller 1100. From the controller 1100, the latent image drawing unit 1075 obtains a latent image character string that is a character string to form a latent image IP. The latent image drawing unit 1075 then generates the latent image IP representing the obtained latent image character string. Lastly, the latent image drawing unit 1075 outputs the generated latent image IP to the code generating unit 1076.

The code generating unit 1076 is connected to the designated image generating unit 1072, the error correction code adding unit 1074, the latent image drawing unit 1075, and the image buffering unit 1078.

The code generating unit 1076 obtains the code information from the error correction code adding unit 1074, the diagonal images (designated images) PS from the designated image generating unit 1072, and the latent image IP from the latent image drawing unit 1075. Using the obtained diagonal-line images (designated images) PS, the code generating unit 1076 generates a restriction code CP and an information code CD representing the obtained code information.

The code generating unit 1076 then generates a tint-block image PB formed with the generated restriction code CP and the information code CD, and also generates a background tint-block image W by combining the latent image IP and the tint-block image PB. After that, the code generating unit 1076 outputs the background tint-block image W to the image buffering unit 1078.

The information code positioning unit 1077 is connected to the image buffering unit 1078 and the controller 1100. From the controller 1100, the information code positioning unit 1077 receives the position information indicating the position at which the background tint-block image W is to be printed on a print medium, and stores the position information. The information code positioning unit 1077 then stores the position information in the image buffering unit 1078, with the position information being associated with the background tint-block image W generated by the code generating unit 1076.

The image buffering unit 1078 is connected to the code generating unit 1076, the information code positioning unit 1077, and the output unit 1090. In the image buffering unit 1078, the background tint-block image W generated by the code generating unit 1076 is stored and associated with the position information indicating the position at which the background tint-block image W is to be printed. The background tint-block image W and the position information associated with each other and stored in the image buffering unit 1078 are later referred to by the superimposing unit 1080.

Referring back to FIG. 2, the structure of the image forming apparatus 1000 is further described.

The superimposing unit 1080 is connected to the image storing unit 1060, the output unit 1090, and the controller 1100.

When receiving an instruction to output only a print image (hereinafter referred to simply as a non-superimposing instruction) from the controller 1100, the superimposing unit 1080 obtains the image developed by the image developing unit 1010 or the image read by the image reading unit 1020 as a print image from the image storing unit 1060, and outputs the obtained print image to the output unit 1090.

When receiving an instruction to superimpose a background image on a print image (hereinafter referred to simply as a superimposing instruction) from the controller 1100, the superimposing unit 1080 obtains the image developed by the image developing unit 1010 or the image read by the image reading unit 1020 as a print image from the image storing unit 1060, and refers to the generating unit 1070 about the background tint-block image W and the position information. Based on the position information, the superimposing unit 1080 superimposes the background tint-block image W on the print image, to generate a superimposed image. The superimposing unit 1080 then outputs the superimposed image to the output unit 1090.

The output unit 1090 may be formed with a printer, for example, and is connected to the superimposing unit 1080 and the controller 1100. Under the control of the controller 1100, the output unit 1090 obtains a superimposed image or an image to be printed from the superimposing unit 1080, and prints out the obtained image onto a printing medium such as a printing paper sheet or board.

In this exemplary embodiment, the output unit 1090 may be formed with a printer, for example, and obtains an image from the superimposing unit 1080 and prints out the obtained image onto a medium such as a printing paper sheet. However, the structure of the output unit 1090 is not limited to that. For example, the output unit 1090 may be a network card or a USB (Universal Serial Bus) card. In such a case, the output unit 1090 transmits images obtained from the superimposing unit 1080 over a network connected to the output unit 1090, or outputs the images to an external memory device connected to the output unit 1090.

Before the controller 1100 is explained, the input unit 1110 and the display 1120 are described.

The display 1120 may be a liquid crystal panel or a CRT (Cathode Ray Tube), for example. The display 1120 is also connected to the controller 1100. Under the control of the controller 1100, the display 1120 displays various kinds of information.

The input unit 1110 may be a keyboard, a touch panel, a pointing device, or buttons, for example. The input unit 1110 is connected to the controller 1100. The input unit 1110 is operated by a user of the image forming apparatus 1000, so that control information and various kinds of instructions are input through the input unit 1110.

The controller 1100 is connected to the tint-block image detecting unit 1040, the information acquiring unit 1050, the image storing unit 1060, the generating unit 1070, the superimposing unit 1080, and the output unit 1090. The controller 1100 controls the tint-block image detecting unit 1040, the information acquiring unit 1050, the image storing unit 1060, the generating unit 1070, the superimposing unit 1080, and the output unit 1090.

Figure 12:
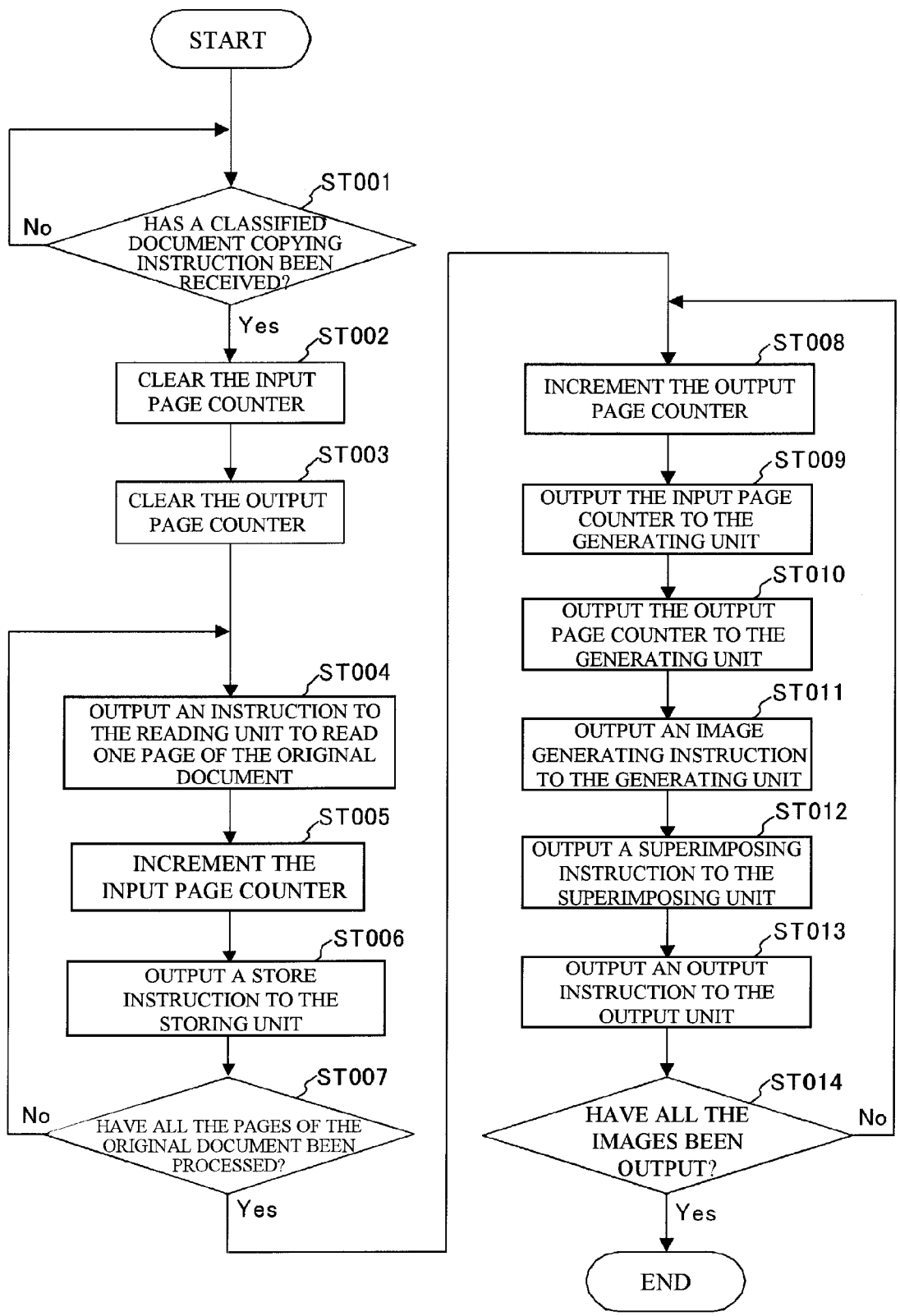
FIG. 12 is a flowchart showing an example of a classified document copying operation to be performed by the controller in accordance with a first exemplary embodiment.
Figure 13:
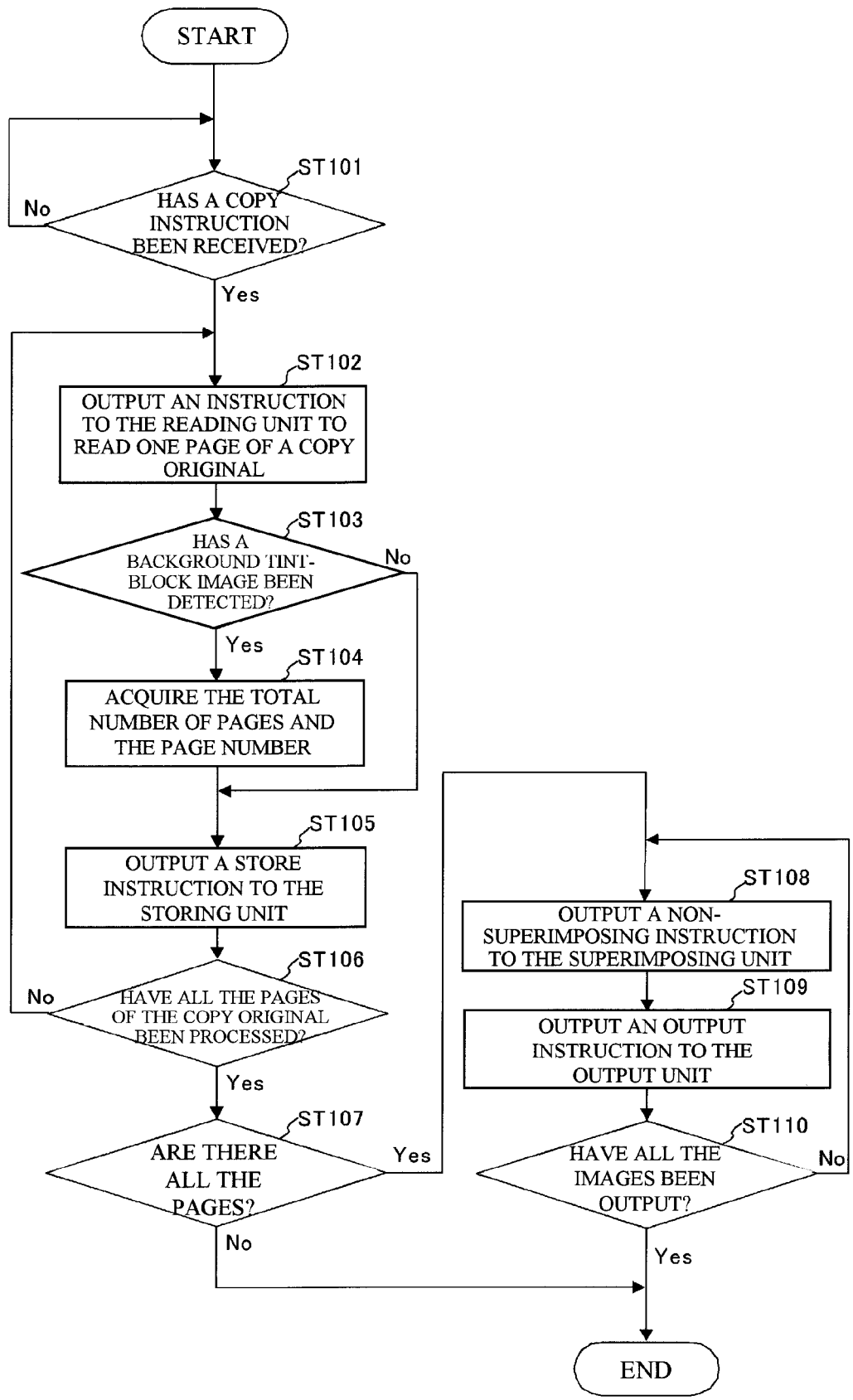
FIG. 13 is a flowchart showing an example of a copying operation to be performed by the controller in accordance with the first exemplary embodiment.

When the image forming apparatus 1000 performs a copying or image output operation, the controller 1100 controls the operations performed by the respective components of the image forming apparatus 1000. Referring now to FIGS. 12 and 13, control operations to be performed by the controller 1100 are described.

For example, in a case where the user of the image forming apparatus 1000 decides that the original document to be duplicated contains classified information, the user inputs an instruction to the image forming apparatus 1000 so as to superimpose the background tint-block image W on a print image when duplicating the original document (hereinafter referred to simply as a classified document copy instruction).

Also, the control operation to be performed by the controller 1100 to control the respective components so as to superimpose the background tint-block image W on a print image when the original document is duplicated will be called a classified document copying operation.

FIG. 12 is a flowchart showing an example of the classified document copying operation to be performed by the controller 1100.

First, the user who is using the image forming apparatus 1000 operates the input unit 1110 or the input unit of the remote terminal 9000 (hereinafter referred to simply as the input unit 1110 or the like), so as to input an instruction so as to perform a classified document copying operation.

The controller 1100 determines whether the classified document copy instruction input through the input unit 1110 or the like has been received (step ST001). If the classified document copy instruction input through the input unit 1110 or the like has been received, the controller 1100 carries out the procedure of step ST002. If the classified document copy instruction input through the input unit 1110 or the like has not been received, the controller 1100 repeats the procedure of step ST001, after a sleep for a predetermined period of time that is not shown in the flowchart.

Here, the controller 1100 causes the memory area in a memory for software control to store a positive number representing the number of print images obtained by the image forming apparatus 1000 during a classified document copying operation (hereinafter referred to simply as the input page counter), and another positive number representing the number of superimposed images that are output by the image forming apparatus 1000 during the classified document copying operation (hereinafter referred to simply as the output page counter).

If the controller 1100 determines that the classified document copy instruction input through the input unit 1110 or the like has been received in step ST001, the controller 1100 inputs the value "0", so as to clear the input page counter (step ST002). The controller 1100 then inputs the value "0", so as to clear the output page counter (step ST003).

After that, the controller 1100 outputs an instruction to the image reading unit 1020 to read the one page of the original document (hereinafter referred to simply as the read instruction) (step ST004). The controller 1100 then increments the input page counter by 1 (step ST005). In this explanation, the original pages to be read by the image reading unit 1020 are the pages constituting one document.

The controller 1100 next outputs an instruction to the image storing unit 1060 to store the print image read by the image reading unit 1020 in step ST004 (hereinafter referred to simply as the store instruction) (step ST006).

The controller 1100 then determines whether the procedures of steps ST004 through ST006 have been carried out for all the pages of the original document (step ST007). In other words, the controller 1100 determines whether images have been read based on all the pages constituting the original document. If the controller 1100 determines that those procedures have been carried out for all the pages of the original document, the controller 1100 next carries out the procedure of step ST008. If the controller 1100 determines that those procedures have not been carried out for all the pages of the original document, the controller 1100 returns to step ST004, and repeats the above procedures.

If the controller 1100 determines that the above procedures have been carried out for all the pages of the original document in step ST007, the controller 1100 increments the output page counter by 1 (step ST008). The controller 1100 then outputs the input page counter (the total number of read images and the total number of pages) to the generating unit 1070 (step ST009).

The controller 1100 next outputs the output page counter to the generating unit 1070 (step ST010). Although not shown, the controller 1100 also outputs information that indicates the concentration of the designated images PS constituting the background tint-block image W, the character string represented by the latent image IP, and the position at which the background tint-block image W is to be superimposed on the print image, to the generating unit 1070.

After that, the controller 1100 outputs an instruction to the generating unit 1070 to generate the background tint-block image W representing the control information including the input page counter that is output in step ST009 and the output page counter that is output in step ST010 (in the steps thereafter in the flowchart shown in FIG. 12, the instruction will be referred to simply as the image generating instruction) (step ST011).

The control information indicates the input page counter and the output page counter as the total number of pages constituting the document that is to be output by the output unit 1090, and the page number in the document.

The controller 1100 next outputs a superimposing instruction to the superimposing unit 1080 to superimpose the background tint-block image W (the control image) generated by the generating unit 1070, on one of the print images that are read by the image reading unit 1020 and are not yet to be output by the output unit 1090 (step ST012).

After that, the controller 1100 outputs an instruction to the output unit 1090 to output the superimposed image generated by the superimposing unit 1080 in step ST012 (the instruction will be hereinafter referred to simply as the output instruction) (step ST013).

The controller 1100 next determines whether the procedure of step ST013 has been carried out for all the superimposed images including the print images obtained by the image reading unit 1020 (step ST014). If the controller 1100 determines that the procedure of step ST013 has been carried out for all the superimposed images, the controller 1100 ends the classified document copying operation. If the controller 1100 determines that the procedure of step ST013 has not been carried out for all the superimposed images, the controller 1100 returns to step ST008, and repeats the above procedures.

In the copying operation described above, a background tint-block image is superimposed on an original not having a background tint-block image superimposed thereon, and the superimposed image is output. However, the present invention is not limited to that, and a background tint-block image may be superimposed on a print document from a personal computer or the like, and the superimposed image is then output. For example, in a case of a print document received through the communication network 100, the image developing unit 1010 obtains information to be the base for developing an image, and then develops an image based on the information. The image developing unit 1010 stores the developed image in the image storing unit 1060. Since the obtained print information contains the total number of pages in the print document and the page information, the print information is superimposed as the background tint-block image W (control image) on the print document and output by the controller 1100 and the generating unit 1070 in the same manner as in the above-described copying operation.

Referring now to FIG. 13, a control operation to be performed by the controller 1100 to duplicate an original document already having the background tint-block image W (hereinafter referred to simply as the copying operation) is described.

First, the user who is using the image forming apparatus 1000 operates the input unit 1110 or the like by pressing a copy start button or the like, so as to input an instruction to perform the copying operation (this instruction will be hereinafter referred to simply as the copy instruction).

The controller 1100 then determines whether the copy instruction that is input through the input unit 1110 or the like has been received (step ST101). If the controller 1100 determines that the copy instruction input through the input unit 1110 or the like has been received, the controller 1100 carries out the procedure of step ST102. If the controller 1100 determines that the copy instruction input through the input unit 1110 or the like has not been received, the controller 1100 repeats the procedure of step ST101, after a sleep for a predetermined period of time.

After that, the controller 1100 outputs an instruction to the image reading unit 1020 to read the one page of the original to be duplicated (hereinafter referred to simply as the read instruction) (step ST102). The controller 1100 then obtains the detection result from the tint-block image detecting unit 1040, and determines whether the background tint-block image W has been detected (step ST103). If the controller 1100 determines that the background tint-block image W has been obtained, the controller 1100 carries out the procedure of step ST104. If the controller 1100 determines that the background tint-block image W has not been obtained, the controller 1100 carries out the procedure of step ST105.

If the controller 1100 determines that the background tint-block image W has been obtained in step ST103, the controller 1100 obtains the control information represented by the background tint-block image W from the information acquiring unit 1050, and extracts information from the obtained control information. The controller 1100 also obtains the total number of pages and the page number contained in the extracted information (step ST104).

When determining that the background tint-block image W has not been obtained in step ST103, or after carrying out the procedure of step ST104, the controller 1100 outputs a store instruction to the image storing unit 1060 to store the image read in step ST104 (step ST105).

The controller 1100 then determines whether the procedures of steps ST102 through ST105 have been carried out for all the pages of the copy original (step ST106). If the controller 1100 determines that those procedures have been carried out for all the pages of the copy original, the controller 1100 next carries out the procedure of step ST107. If the controller 1100 determines that those procedures have not been carried out for all the pages of the copy original, the controller 1100 returns to step ST102, and repeats the above procedures.

If the controller 1100 determines that the above procedures have been carried out for all the pages of the copy original in step ST106, the controller 1100 determines whether there are all the pages of the document, based on the total number of pages and the page number obtained in step ST104 (step ST107).

More specifically, the controller 1100 determines that there are all the pages in a case where the total numbers of pages represented by the background tint-block images W detected in step ST104 are all the same, the image containing the background tint-block image W indicating that the page number is 1 is read in step ST102, the page numbers represented by the background tint-block images W contained in the images read in step ST102 are consecutive numbers (or there is not a missing number), and the total number of images containing the background tint-block images W is equal to the total number of pages. If the controller 1100 determines that there are all the pages, the controller 1100 carries out the procedure of step ST108. If the controller 1100 determines that there are not all the pages, the controller 1100 ends the operation.

If the controller 1100 determines that there are all the pages in step ST107, the controller 1100 outputs a non-superimposing instruction to the superimposing unit 1080 to obtain one of the images that are stored by the image storing unit 1060 in step ST105 and are not yet to be output by the output unit 1090, and to output the obtained image to the output unit 1090, with the background tint-block image W being not superimposed on the obtained image (step ST108).

After that, the controller 1100 outputs an output instruction to the output unit 1090 to output the image obtained from the superimposing unit 1080 (step ST110).

The controller 1100 then determines whether the procedure of step ST109 has been carried out for all the print images obtained by the image reading unit 1020 in step ST102 (step ST110). If the controller 1100 determines that the procedure of step ST109 has been carried out for all the superimposed images, the controller 1100 ends the superimposed output operation. If the controller 1100 determines that the procedure of step ST109 has not been carried out for all the superimposed images, the controller 1100 returns to step ST108, and repeats the above procedures.

The following is a description of a second exemplary embodiment of the present invention.

The second exemplary embodiment differs from the first exemplary embodiment in that the control information contains document identifying information.

Second Exemplary Embodiment

An image forming system in accordance with the second exemplary embodiment of the present invention has substantially the same structure and functions as the image forming system in accordance with the first exemplary embodiment. Therefore, the difference between the first exemplary embodiment and the second exemplary embodiment will be described below.

Figure 14:
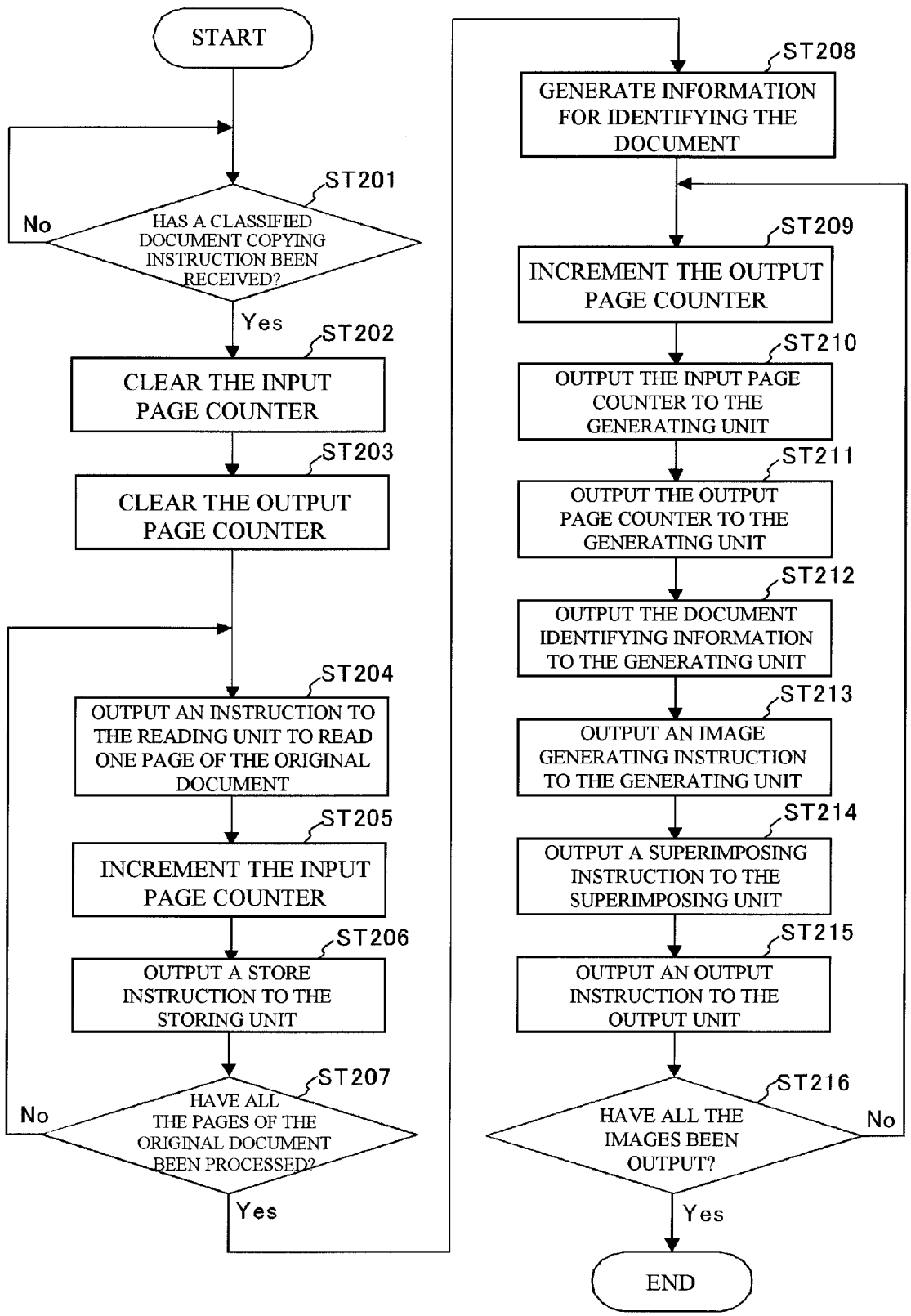
FIG. 14 is a flowchart showing an example of a classified document copying operation to be performed by the controller in accordance with a second exemplary embodiment.

Referring now to FIG. 14, a classified document copying operation to be performed by the controller 1100 in accordance with the second exemplary embodiment is described. FIG. 14 is a flowchart showing an example of a classified document copying operation to be performed by the controller 1100.

First, the controller 1100 carries out the procedures of steps ST201 through ST207. Since the procedures of steps ST201 through ST207 are the same as the procedures of steps ST001 through ST007 described with reference to FIG. 12, explanation of them is omitted here.

After carrying out the procedure of step ST207, the controller 1100 generates information for identifying the document constituted by the pages carrying the read print images (this information will be hereinafter referred to simply as the document identifying information) (step ST208).

After that, the controller 1100 carries out the procedures of steps ST209 through ST211. Since the procedures of steps ST209 through ST211 are the same as the procedures of steps ST008 through ST010 described with reference to FIG. 12, explanation of them is omitted here.

After carrying out the procedure of step ST211, the controller 1100 outputs the document identifying information generated in step ST208 to the generating unit 1070 (step ST212).

After that, the controller 1100 outputs an instruction to the generating unit 1070 to generate the background tint-block image W representing the control information containing the input page counter that is output in step ST210, the output page counter that is output in step ST211, and the document identifying information that is output in step ST212 (in the steps thereafter in the flowchart shown in FIG. 14, this instruction will be referred to simply as the image generating instruction) (step ST213).

The controller 1100 then carries out the procedures of steps ST214 and ST215. Since the procedures of steps ST214 and ST215 are the same as the procedures of steps ST012 and ST013 described with reference to FIG. 12, explanation of them is omitted here.

After carrying out the procedure of step ST215, the controller 1100 determines whether the procedure of step ST215 has been carried out for all the superimposed images including the print images obtained by the image reading unit 1020 (step ST216). If the controller 1100 determines that the procedure of step ST215 has been carried out for all the superimposed images, the controller 1100 ends the classified document copying operation. If the controller 1100 determines that the procedure of step ST215 has not been carried out for all the superimposed images, the controller 1100 returns to step ST209, and repeats the above procedures.

Figure 15:
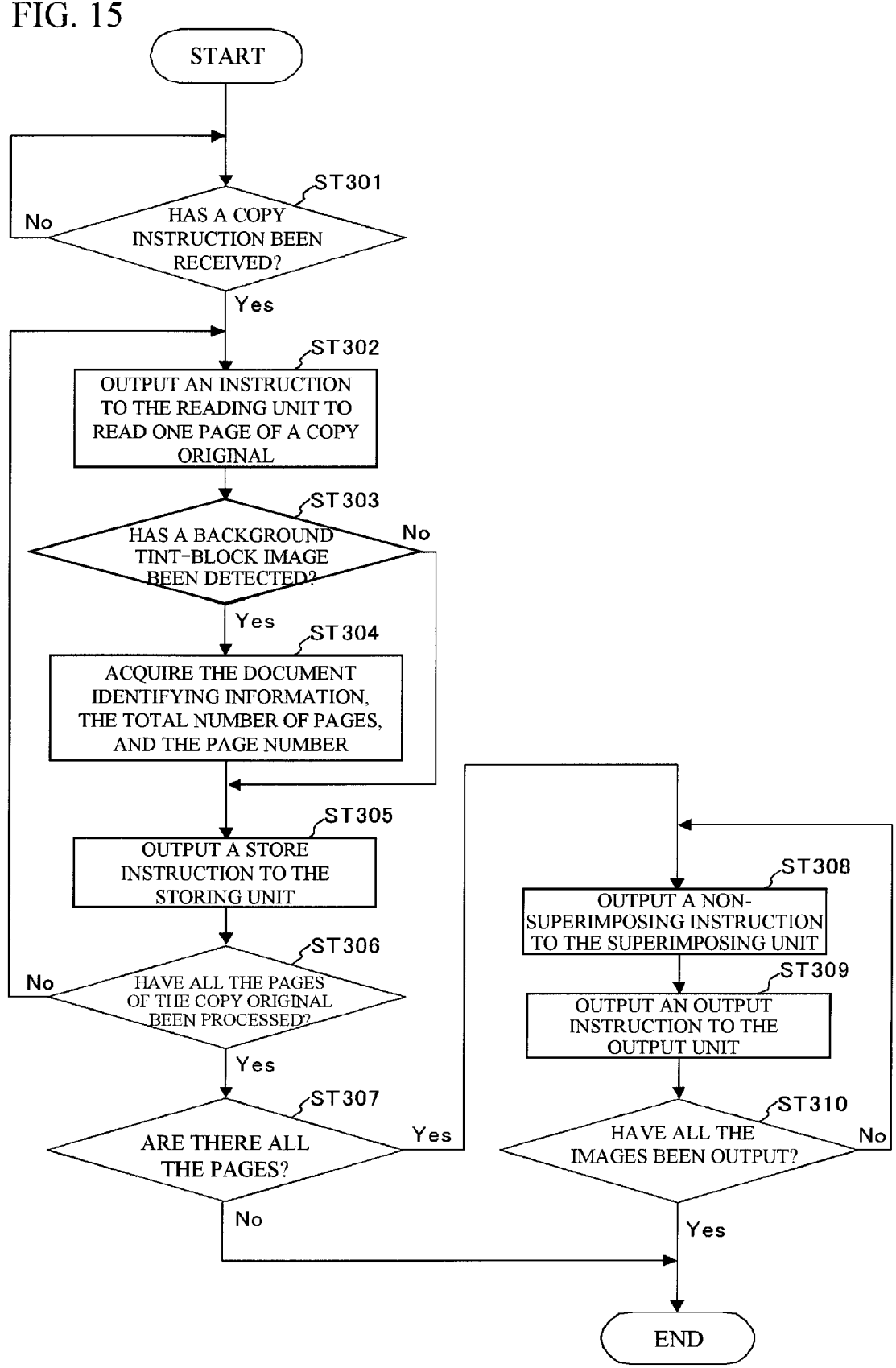
FIG. 15 is a flowchart showing an example of a copying operation to be performed by the controller in accordance with the second exemplary embodiment.

Referring now to FIG. 15, a copying operation to be performed by the controller 1100 in accordance with the second exemplary embodiment is described. FIG. 15 is a flowchart showing an example of a copying operation to be performed by the controller 1100.

First, the controller 1100 carries out the procedures of steps ST301 through ST303. Since the procedures of steps ST301 through ST303 are the same as the procedures of steps ST101 through ST103 described with reference to FIG. 13, explanation of them is omitted here.

If the controller 1100 determines that the background tint-block image W has been obtained in step ST303, the controller 1100 obtains the control information represented by the background tint-block image W from the information acquiring unit 1050, and extracts the document identifying information, the total number of pages, and the page number from the obtained control information (step ST304).

When determining that the background tint-block image W has not been obtained in step ST303, or after carrying out the procedure of step ST304, the controller 1100 carries out the procedures of steps ST305 and ST306. Since the procedures of steps ST305 and ST306 are the same as the procedures of steps ST105 and ST106, explanation of them is omitted here.

If the controller 1100 determines that the above procedures have been carried out for all the pages of the copy original in step ST306, the controller 1100 determines whether there are all the pages of the document, based on the document identifying information, the total number of pages, and the page number obtained in step ST304 (step ST307). If the controller 1100 determines that there are all the pages, the controller 1100 next carries out the procedure of step ST308. If the controller 1100 determines that there are not all the pages, the controller 1100 ends the operation.

More specifically, the controller 1100 determines that there are all the pages in a case where the document identifying information and the total numbers of pages represented by the background tint-block images W detected in step ST304 are all the same, the image containing the background tint-block image W indicating that the page number is 1 is read in step ST302, the page numbers represented by the background tint-block images W contained in the images read in step ST302 are consecutive numbers (or there is not a missing number), and the total number of superimposed images is equal to the total number of pages.

If the controller 1100 determines that there are all the pages in step ST307, the controller 1100 carries out the procedures of steps ST308 through ST310. After that, the controller 1100 ends the operation. Since the procedures of steps ST308 through ST310 are the same as the procedures of steps ST108 through ST110 described with reference to FIG. 13, explanation of them is omitted here.

The following is a description of a third exemplary embodiment of the present invention.

The third exemplary embodiment differs from the first exemplary embodiment in that the control information contains information indicating authentication conditions.

Third Exemplary Embodiment

An image forming system in accordance with the third exemplary embodiment of the present invention has substantially the same structure and functions as the image forming system in accordance with the first exemplary embodiment. Therefore, the difference between the first exemplary embodiment and the third exemplary embodiment will be described below.

Figure 16:
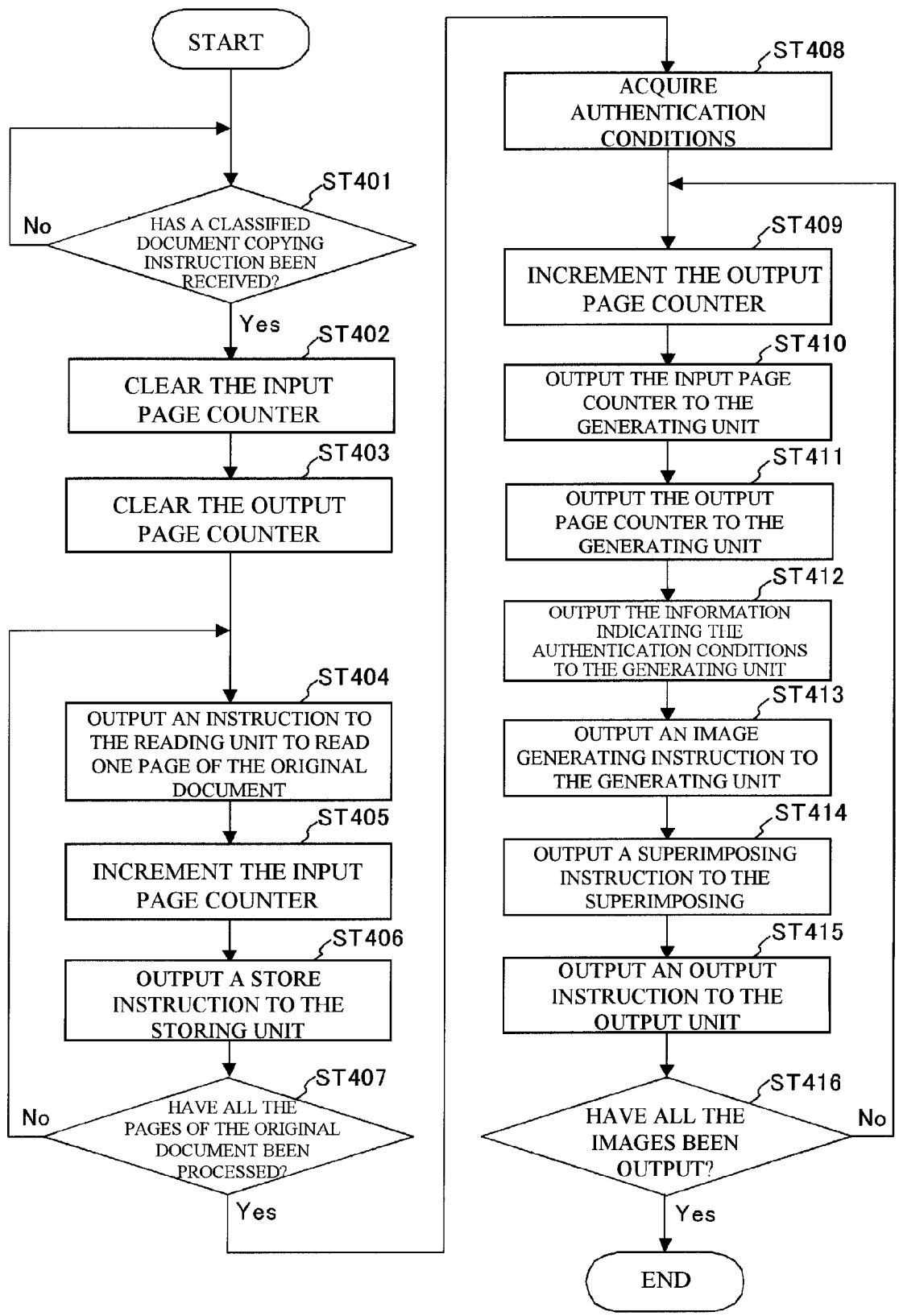
FIG. 16 is a flowchart showing an example of a classified document copying operation to be performed by the controller in accordance with a third exemplary embodiment.

Referring now to FIG. 16, a classified document copying operation to be performed by the controller 1100 in accordance with the third exemplary embodiment is described. FIG. 16 is a flowchart showing an example of a classified document copying operation to be performed by the controller 1100.

First, the controller 1100 carries out the procedures of steps ST401 through ST407. Since the procedures of steps ST401 through ST407 are the same as the procedures of steps ST001 through ST007 described with reference to FIG. 12, explanation of them is omitted here.

After carrying out the procedure of step ST407, the controller 1100 obtains the authentication conditions that are input by the user of the image forming apparatus 1000 operating the input unit 1110 or the like (step ST408).

Under the authentication conditions, a password that is input as authentication information by the user operating the input unit 1110 should match a predetermined password in a case of password authentication, for example. The present invention is not limited to the password authentication case. For example, in a case of user authentication, under the authentication conditions, user identifying information and a password that are input as the authentication information should match the information for identifying a certain user and a predetermined password. In a case of biometrics authentication, under the authentication conditions, the information for identifying the user and the biologic information about the user that are input as the authentication information should match the information for identifying a certain user and the biometrics information about the certain user.

The controller 1100 then carries out the procedures of steps ST409 through ST411. Since the procedures of steps ST409 through ST411 are the same as the procedures of steps ST008 through ST010 described with reference to FIG. 12, explanation of them is omitted here.

After carrying out the procedure of step ST411, the controller 1100 outputs the information indicating the authentication conditions obtained in step ST408, to the generating unit 1070 (step ST412).

The controller 1100 then outputs an instruction to the generating unit 1070 to generate the background tint-block image W representing the control information containing the input page counter that is output in step ST410, the output page counter that is output in step ST411, and the authentication conditions that are output in step ST412 (in the steps thereafter in the flowchart shown in FIG. 16, this instruction will be referred to simply as the image generating instruction) (step ST413).

The controller 1100 then carries out the procedures of steps ST414 and ST415. Since the procedures of steps ST414 and ST415 are the same as the procedures of steps ST012 and ST013 described with reference to FIG. 12, explanation of them is omitted here.

After that, the controller 1100 determines whether the procedure of step ST415 has been carried out for all the superimposed images including the print images obtained by the image reading unit 1020 (step ST416). If the controller 1100 determines that the procedure of step ST415 has been carried out for all the superimposed images, the controller 1100 ends the classified document copying operation. If the controller 1100 determines that the procedure of step ST415 has not been carried out for all the superimposed images, the controller 1100 returns to step ST409, and repeats the above procedures.

Figure 17:
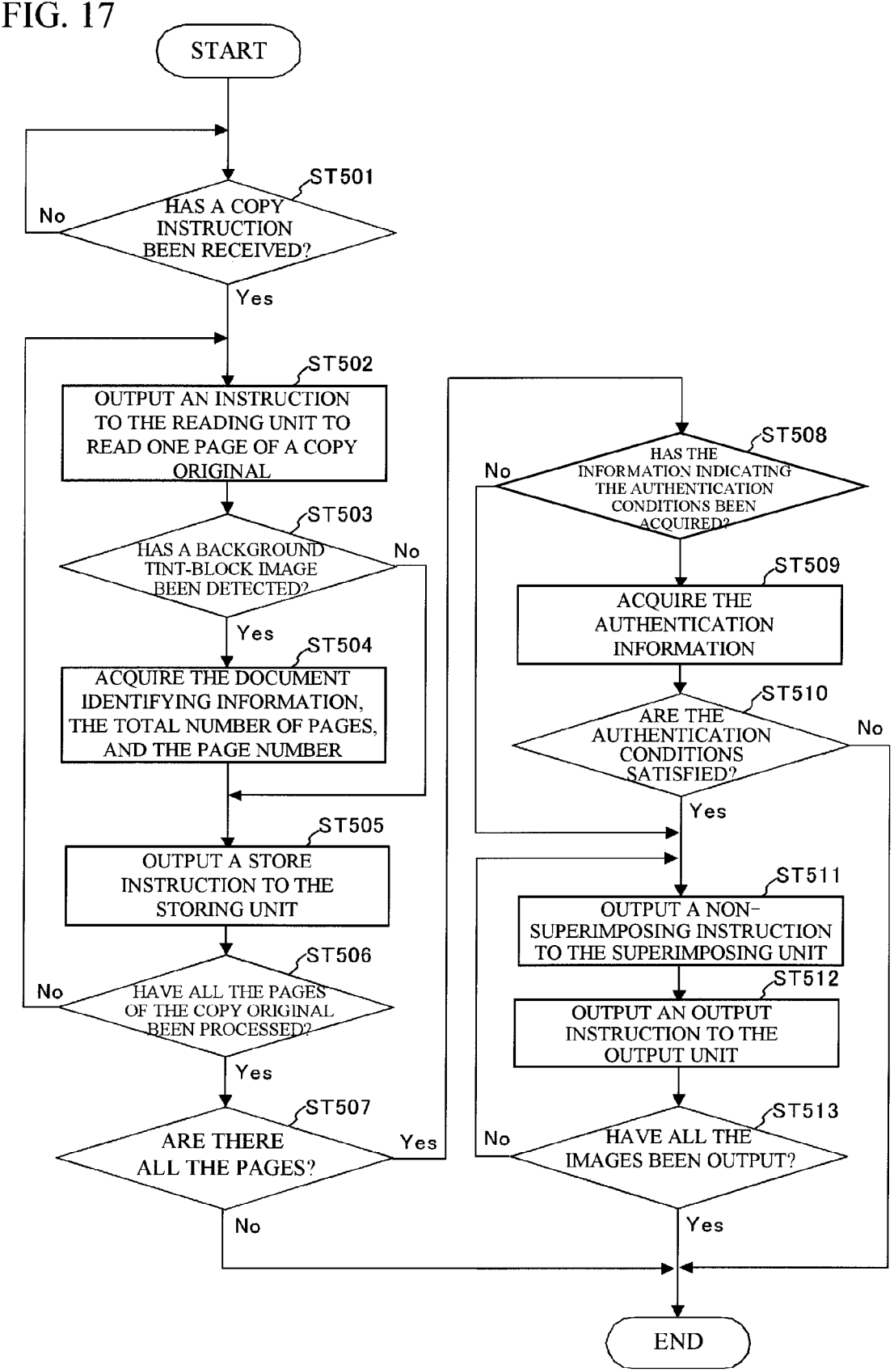
FIG. 17 is a flowchart showing an example of a copying operation to be performed by the controller in accordance with the third exemplary embodiment.

Referring now to FIG. 17, a copying operation to be performed by the controller 1100 in accordance with the third exemplary embodiment is described. FIG. 17 is a flowchart showing an example of a copying operation to be performed by the controller 1100.

First, the controller 1100 carries out the procedures of steps ST501 through ST503. Since the procedures of steps ST501 through ST503 are the same as the procedures of steps ST101 through ST103 described with reference to FIG. 13, explanation of them is omitted here.

If the controller 1100 determines that the background tint-block image W has been obtained in step ST503, the controller 1100 obtains the information indicating the authentication information represented by the background tint-block image W, the total number of pages, and the page number, from the information acquiring unit 1050 (step ST504).

When determining that the background tint-block image W has not been obtained in step ST503, or after carrying out the procedure of step ST504, the controller 1100 carries out the procedures of steps ST505 through ST507. Since the procedures of steps ST505 through ST507 are the same as the procedures of steps ST105 through ST107, explanation of them is omitted here.

If the controller 1100 determines that there are all the pages in step ST507, the controller 1100 determines whether the information indicating the authentication information has been obtained in step ST504 (step ST508). If the controller 1100 determines that the information indicating the authentication information has been obtained, the controller 1100 next carries out the procedure of step ST509. If the controller 1100 determines that the information indicating the authentication information has not been obtained, the controller 1100 next carries out the procedure of step ST511.

If the controller 1100 determines in step ST508 that the information indicating the authentication information has been obtained, the controller 1100 obtains the authentication information through the input unit 1110 or the like (step ST509).

The controller 1100 then determines whether the authentication information obtained in step ST509 satisfies the authentication conditions indicated by the information obtained in step ST504 (step ST510). If the controller 1100 determines that the authentication information satisfies the authentication conditions, the controller 1100 carries out the procedure of step ST511. If the controller 1100 determines that the authentication information does not satisfy the authentication conditions, the controller 1100 ends the operation.

If the controller 1100 determines in step ST508 that the information indicating the authentication information has not been obtained, or if the controller 1100 determines in step ST510 that the information satisfies the authentication conditions, the controller 1100 carries out the procedures of steps ST511 and ST512. Since the procedures of steps S511 and ST512 are the same as the procedures of steps ST108 and ST109 described with reference to FIG. 13, explanation of them is omitted here.

After carrying out the procedure of step ST512, the controller 1100 determines whether the procedure of step ST512 has been carried out for all the print images obtained by the image reading unit 1020 in step ST502 (step ST513). If the controller 1100 determines that the procedure of step ST512 has been carried out for all the superimposed images, the controller 1100 ends the classified document copying operation. If the controller 1100 determines that the procedure of step ST512 has not been carried out for all the superimposed images, the controller 1100 returns to step ST511, and repeats the above procedures.

The functions of the image forming apparatuses 1000 can be realized by the operating part executing a program stored in at least one of the ROM, RAM, and the external memory device. Alternatively, this program may be distributed as a program recorded on magnetic discs, optical discs, semiconductor memories, or other recording media, or may be provided via a network.

Although a few exemplary embodiments of the present invention have been described so far, the present invention is not limited to those particular exemplary embodiments, and various modifications and changes may be made to them without departing from the scope of the invention that is defined in the claims and their equivalents.

In the above-described exemplary embodiments, each external memory device is a hard disk. However, the present invention is not limited to that arrangement. For example, the external memory devices may be flexible disks, CD-ROMs (Compact Disc Read Only Memories), DVD-ROMs (Digital Versatile Disk Read Only Memories), DVD-RAMs (Digital Versatile Disk Random Access Memories), MOs (magneto-optic disks), or flash memories.

Although the control images include background tint-block images in the above exemplary embodiments, the present invention is not limited to that arrangement. For example, the control images may include one-dimensional bar codes, or two-dimensional codes such as Code 49, Code 16K, PDF 417, or Maxicode.

What is claimed is:

1. An image forming apparatus comprising:
   a generating unit that generates a control image representing control information that controls an operation performed by the image forming apparatus, the control image comprising a page number of a page of an original document and a total number of pages of the original document;
   a superimposing unit that superimposes the control image generated by the generating unit on each of a plurality of pages of the original document, the control image superimposed on the plurality of pages respectively comprising the page number of the page of the original document and the total number of pages of the original document; and
   an output unit that respectively outputs the control image superimposed on each of the plurality of pages as superimposed pages of a superimposed document,
   wherein the control information controls the image forming apparatus to produce a copy of the superimposed document in response to receiving the superimposed document and determining that all of the pages of the superimposed document are received by the image forming apparatus based on the control image superimposed on each of the pages of the superimposed document.

2. The image forming apparatus according to claim 1, wherein the control image further comprises authentication information that indicates whether the page of the document is authentic.

3. The image forming apparatus according to claim 1, wherein:
   the page number of the control images respectively superimposed on the superimposed pages are an ascending order page numbers of the pages of the original document.

4. An image forming apparatus comprising:
   an image acquiring unit that acquires a superimposed document that includes a plurality of superimposed pages, each of the plurality of superimposed pages of the superimposed document comprising a control image superimposed on a page of an original document, the control image superimposed on the plurality of superimposed pages respectively comprising a page number of a page of the original document and a total number of pages of the original document;
   an output unit that outputs a copy of the superimposed document acquired by the image acquiring unit;
   an information acquiring unit that acquires the page number of the page and the total number of pages from the control images of the plurality of superimposed pages acquired by the image acquiring unit; and
   a controller that determines that all of the plurality of superimposed pages of the superimposed document are received, based on the control image superimposed on each of the plurality of superimposed pages, and controls the output unit to output a copy of the superimposed document in response to determining that all of the plurality of superimposed pages are received.

5. The image forming apparatus according to claim 4, wherein
   the controller controls the output unit to not output the copy of the superimposed document in response to determining that all of the plurality of superimposed pages are not received.

6. The image forming apparatus according to claim 4, wherein the control image further comprises authentication information that indicates whether a page of the document is authentic
   wherein the controller controls the output unit to output the copy of the superimposed document in response to determining that all of the plurality of superimposed pages are authentic, based on the authentication information and
   controls the output unit to not output the copy of the superimposed document in response to determining that all of the plurality of superimposed pages are authentic, based on the authentication information.

7. An image forming system comprising:
   a generating unit that generates a control image representing control information that controls an operation performed by an image forming apparatus, the control image comprising a page number of a page of an original document and a total number of pages of the original document;
   a superimposing unit that superimposes the control image generated by the generating unit on each of a plurality of pages of the original document, the control image superimposed on the plurality of pages respectively comprising the page number of the page of the original document and the total number of pages of the original document; and
   an output unit that respectively outputs the control image superimposed on each of the plurality of pages as superimposed pages of a superimposed document,
   wherein the control information controls an image forming apparatus to produce a copy of the superimposed document in response to receiving the superimposed document and determining that all of the pages of the superimposed document are received by the image forming apparatus based on the control image superimposed on each of the pages of the superimposed document.

8. An image forming system comprising:
   an image acquiring unit that acquires a superimposed document that includes a plurality of superimposed pages, each of the plurality of superimposed pages of the superimposed document comprising a control image superimposed on a page of an original document, the control image superimposed on the plurality of superimposed pages respectively comprising a page number of a page of the original document and a total number of pages of the original document;
   an output unit that outputs a copy of the superimposed document acquired by the image acquiring unit;
   an information acquiring unit that acquires the page number of the page and the total number of pages from the control images of the plurality of superimposed pages acquired by the image acquiring unit; and
   a controller of an image forming apparatus that determines that all of the plurality of superimposed pages of the superimposed document are received, based on the control image superimposed on each of the plurality of superimposed pages, and controls the output unit to output a copy of the superimposed document in response to determining that all of the plurality of superimposed pages are received.

9. A non-transitory computer readable recording medium storing a program causing a computer to execute a process for image forming, the process comprising:
- generating a control image representing control information that controls an operation performed by an image forming apparatus, the control image comprising a page number of a page of an original document and a total number of pages of the original document;
- superimposing the control image on each of a plurality of pages of the original document, the control image superimposed on the plurality of pages respectively comprising the page number of the page of the original document and the total number of pages of the original document; and
- outputting the control image superimposed on each of the plurality of pages as superimposed pages of a superimposed document,
- wherein the control information controls the image forming apparatus to produce a copy of the superimposed document in response to receiving the superimposed document and determine that all of the pages of the superimposed document are received by the image forming apparatus based on the control image superimposed on each of the pages of the superimposed document.

10. A non-transitory computer readable recording medium storing a program causing a computer to execute a process for image forming, the process comprising:
- acquiring a superimposed document that includes a plurality of superimposed pages, each of the plurality of superimposed pages of the superimposed document comprising a control image superimposed on a page of an original document, the control image superimposed on the plurality of superimposed pages respectively comprising a page number of a page of the original document and a total number of pages of the original document;
- outputting a copy of the superimposed document;
- acquiring the page number of the page and the total number of pages from the control images of the plurality of superimposed pages; and
- controlling execution of an image forming apparatus to determine that all of the plurality of superimposed pages of the superimposed document are received, based on the control image superimposed on each of the plurality of superimposed pages, and to output a copy of the superimposed document in response to determining that all of the plurality of superimposed pages are received.

11. An image forming method comprising:
- generating a control image representing control information that controls an operation performed by an image forming apparatus, the control image comprising a page number of a page of an original document and a total number of pages of the original document;
- superimposing the control image on each of a plurality of pages of the original document, the control image superimposed on the plurality of pages respectively comprising the page number of the page of the original document and the total number of pages of the original document; and
- outputting the control image superimposed on each of the plurality of pages as superimposed pages of a superimposed document,
- wherein the control information controls the image forming apparatus to produce a copy of the superimposed document in response to receiving the superimposed document and determine that all of the pages of the superimposed document are received by the image forming apparatus based on the control image superimposed on each of the pages of the superimposed document.

12. An image forming method comprising:
- acquiring a superimposed document that includes a plurality of superimposed pages, each of the plurality of superimposed pages of the superimposed document comprising a control image superimposed on a page of an original document, the control image superimposed on the plurality of superimposed pages respectively comprising a page number of a page of the original document and a total number of pages of the original document;
- outputting a copy of the superimposed document;
- acquiring the page number of the page and the total number of pages from the control images of the plurality of superimposed pages; and
- controlling execution of an image forming apparatus to determine that all of the plurality of superimposed pages of the superimposed document are received, based on the control image superimposed on each of the plurality of superimposed pages, and to output a copy of the superimposed document in response to determining that all of the plurality of superimposed pages are received.

* * * * *